US011472066B2

(12) United States Patent
Moll et al.

(10) Patent No.: US 11,472,066 B2
(45) Date of Patent: Oct. 18, 2022

(54) STACKABLE/NESTING STENCIL OR MOLD SYSTEM FOR MODELING COMPOUND

(71) Applicant: CRAYOLA LLC, Easton, PA (US)

(72) Inventors: Joseph Thomas Moll, Bethlehem, PA (US); Erin O'Boyle Westgate, Bethlehem, PA (US); Robert J. Marino, Altadena, CA (US)

(73) Assignee: Crayola LLC, Easton, PA (US)

( * ) Notice: Subject to any disclaimer, the term of this patent is extended or adjusted under 35 U.S.C. 154(b) by 743 days.

(21) Appl. No.: 16/444,387

(22) Filed: Jun. 18, 2019

(65) Prior Publication Data
US 2019/0381740 A1 Dec. 19, 2019

Related U.S. Application Data

(60) Provisional application No. 62/686,483, filed on Jun. 18, 2018.

(51) Int. Cl.
B29C 33/00 (2006.01)
B29C 33/30 (2006.01)
B29C 65/70 (2006.01)

(52) U.S. Cl.
CPC ........ B29C 33/301 (2013.01); B29C 33/0088 (2013.01); B29C 65/70 (2013.01); B29C 2791/002 (2013.01)

(58) Field of Classification Search
CPC . B29C 33/0088; B29C 33/301; B29C 33/302; A47J 43/20; A63H 33/001
See application file for complete search history.

(56) References Cited

U.S. PATENT DOCUMENTS 83,210 A * 10/1868 Ripley ................ B29C 45/0017
249/58
1,957,133 A * 5/1934 Davis .................... A47J 37/0611
99/424
2,264,628 A * 12/1941 Engert .................... G09F 15/02
156/277
2,274,060 A * 2/1942 Fredv ...................... A43D 3/02
164/520

(Continued)

FOREIGN PATENT DOCUMENTS

DE 3204474 A1 * 8/1983 .......... A63H 33/001
FR 3005239 A1 * 11/2014 ............... A21B 3/13

Primary Examiner — Timothy Kennedy
(74) Attorney, Agent, or Firm — Shook, Hardy & Bacon L.L.P.

(57) ABSTRACT

The technology described herein relates to a system of stackable/nesting stencils or molds for creating 3-D objects using a modeling compound material. The stencils or molds can be filled with the modeling compound material by hand and/or leveled using a roller to flatten the compound material more smoothly for a better outcome. Each stencil has a level and nests with another corresponding stencil of the set in a designated order. In some aspects, in order to guide a user with the correct designated order in which to fill the stencil plates or molds, each stencil plate or mold may be provided with a numbered tab. Once all the stencils are filled in the designated order with modeling compound materials, the stencil plates can be removed level by level to reveal a finished 3-D object. These 3-D objects may be anything from characters, vehicles, objects, figurines, and the like.

17 Claims, 20 Drawing Sheets

(56) References Cited

U.S. PATENT DOCUMENTS

| | | | | |
|---|---|---|---|---|
| 2,291,672 A * | 8/1942 | Youngberg | ............. | A01J 19/00 249/168 |
| 2,487,866 A * | 11/1949 | Gregg | ................... | B29C 33/08 425/398 |
| 2,684,503 A * | 7/1954 | Silver | ...................... | B44C 3/04 264/254 |
| 3,059,279 A * | 10/1962 | Rossi | .................... | A63H 33/32 249/55 |
| 3,624,691 A * | 11/1971 | Robson | ................... | A63H 3/04 446/374 |
| 3,807,086 A * | 4/1974 | Schleich | ................. | A63H 3/04 446/374 |
| 4,417,716 A * | 11/1983 | Penna | .................... | F25C 1/243 249/129 |
| 4,571,209 A * | 2/1986 | Manning | ................. | A63H 3/46 446/376 |
| 5,303,473 A * | 4/1994 | Sadler | ................... | A21C 11/106 30/130 |
| 5,389,176 A * | 2/1995 | Nakanishi | ............. | A43B 13/22 427/259 |
| 5,396,713 A * | 3/1995 | Valdez | ................... | B43L 13/20 428/53 |
| D358,599 S * | 5/1995 | Dietterich | | |
| 5,413,472 A * | 5/1995 | Dietterich | ............ | B29C 33/303 425/188 |
| 6,176,464 B1 * | 1/2001 | Harvey | .................... | F25C 1/22 249/126 |
| 6,381,852 B1 * | 5/2002 | Wallays | ............... | A21C 11/106 206/349 |
| 6,386,854 B1 * | 5/2002 | Guss | ..................... | A21C 9/066 425/408 |
| 7,318,575 B2 * | 1/2008 | Welch | .................... | A47J 43/20 249/DIG. 1 |
| 7,442,025 B2 * | 10/2008 | Rivera | .................... | A23P 30/10 425/408 |
| 7,963,500 B1 * | 6/2011 | Holiday | .................. | B29C 39/02 249/117 |
| 8,454,881 B2 * | 6/2013 | Ishii | .................... | A63H 33/001 264/247 |
| 2016/0120194 A1 * | 5/2016 | Weber | ................... | A22C 7/0076 426/512 |
| 2018/0117486 A1 * | 5/2018 | McCloskey | .......... | A63H 33/086 |
| 2019/0255453 A1 * | 8/2019 | McCloskey | .......... | A63H 33/086 |

\* cited by examiner

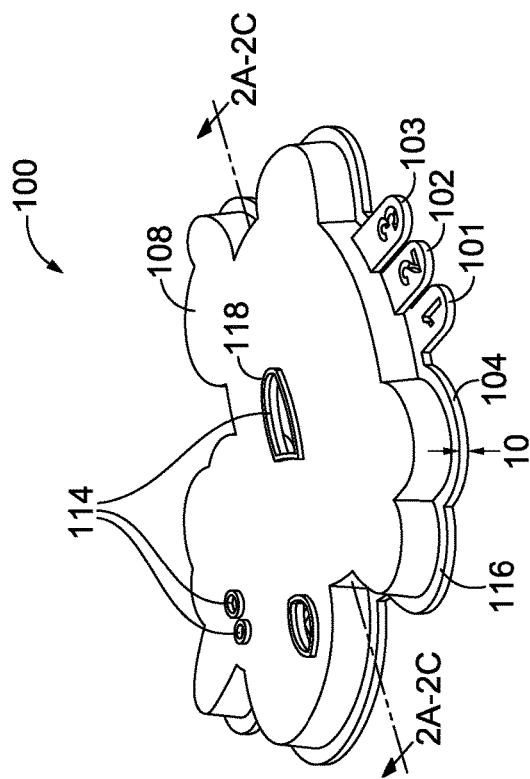
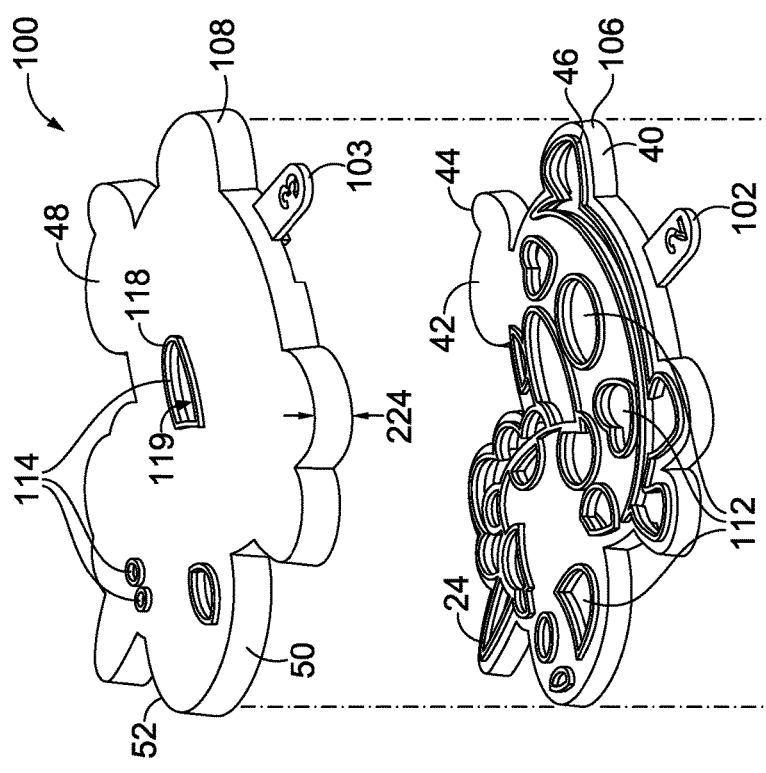
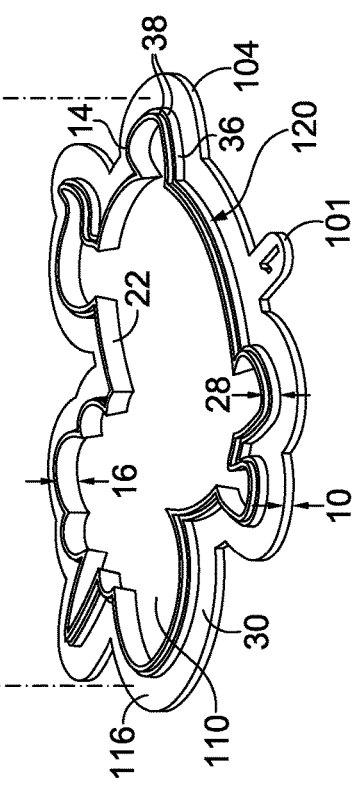

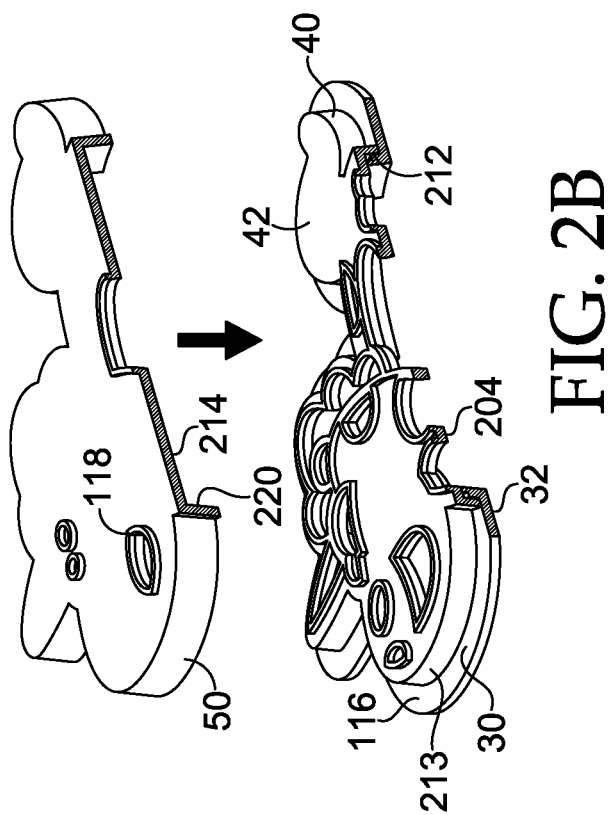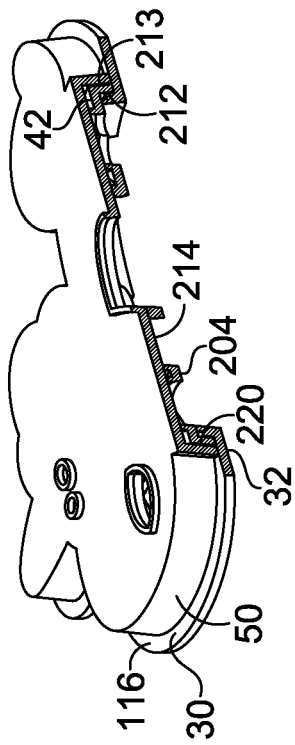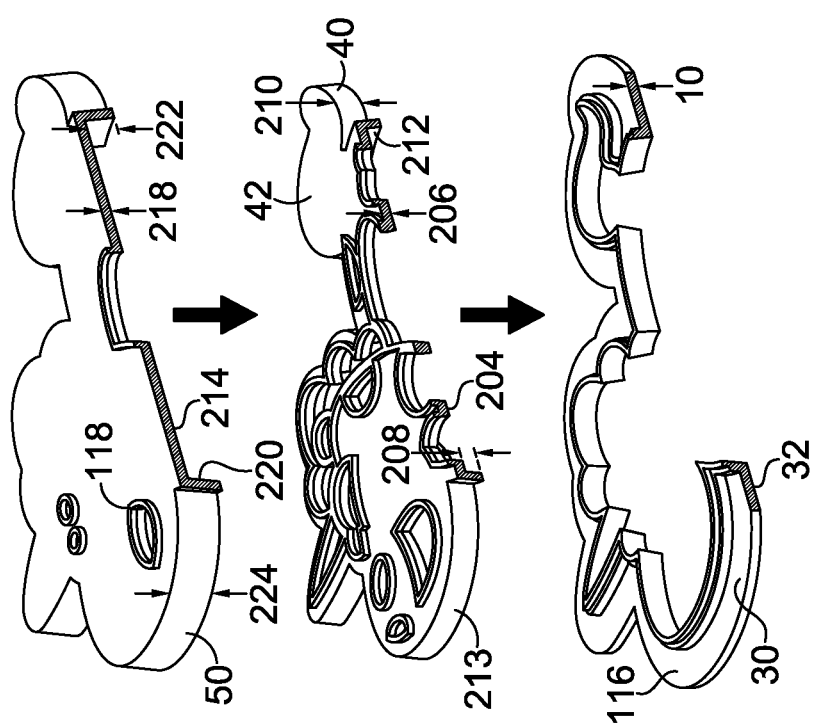

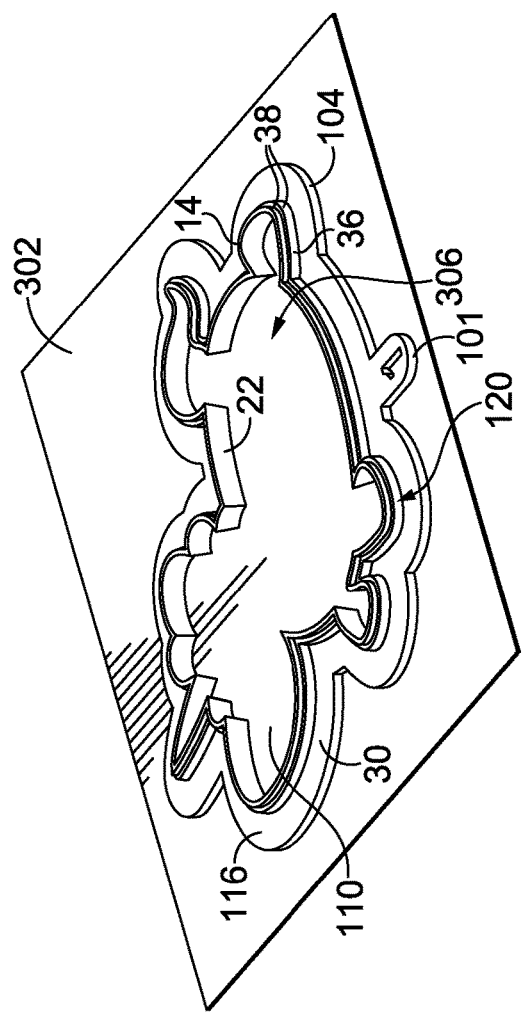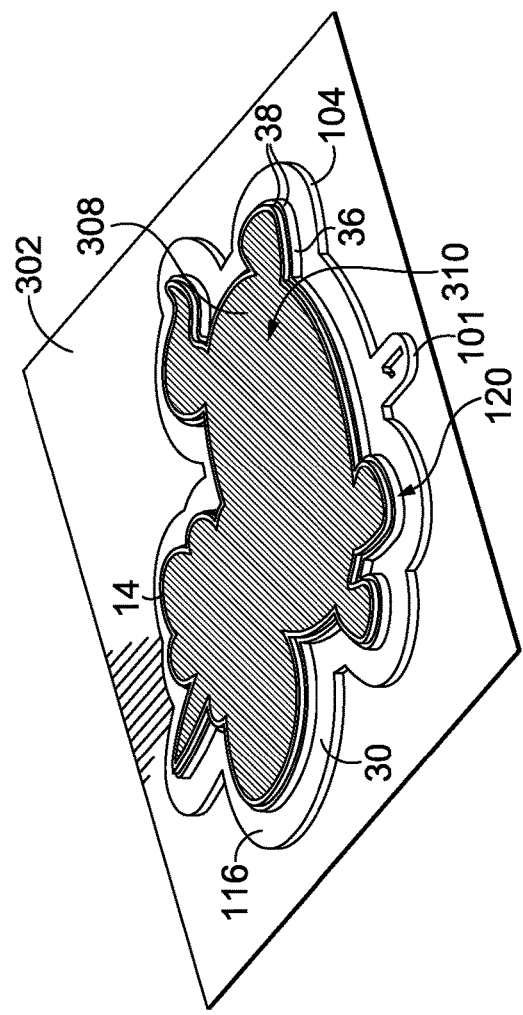

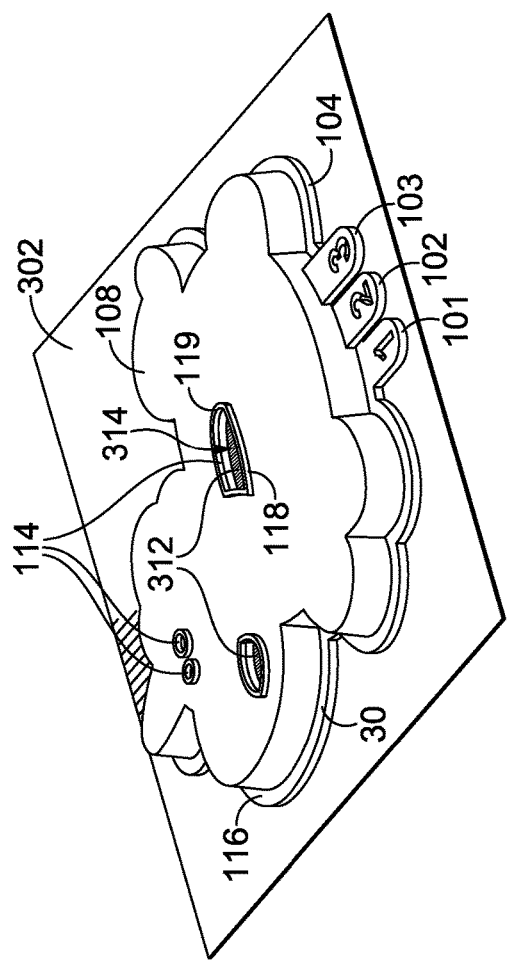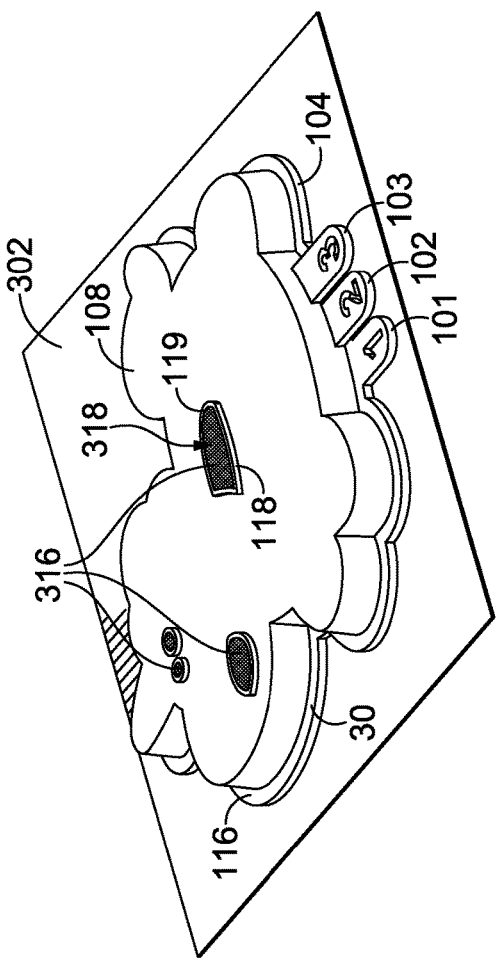
FIG. 3E
FIG. 3F

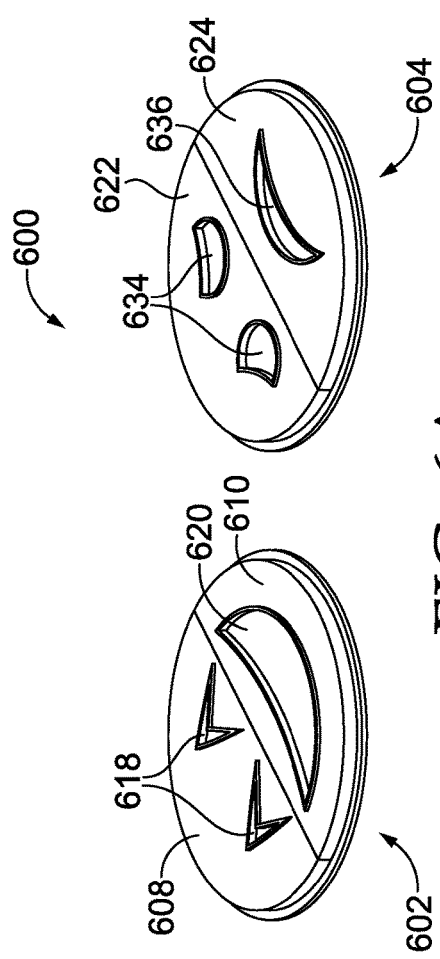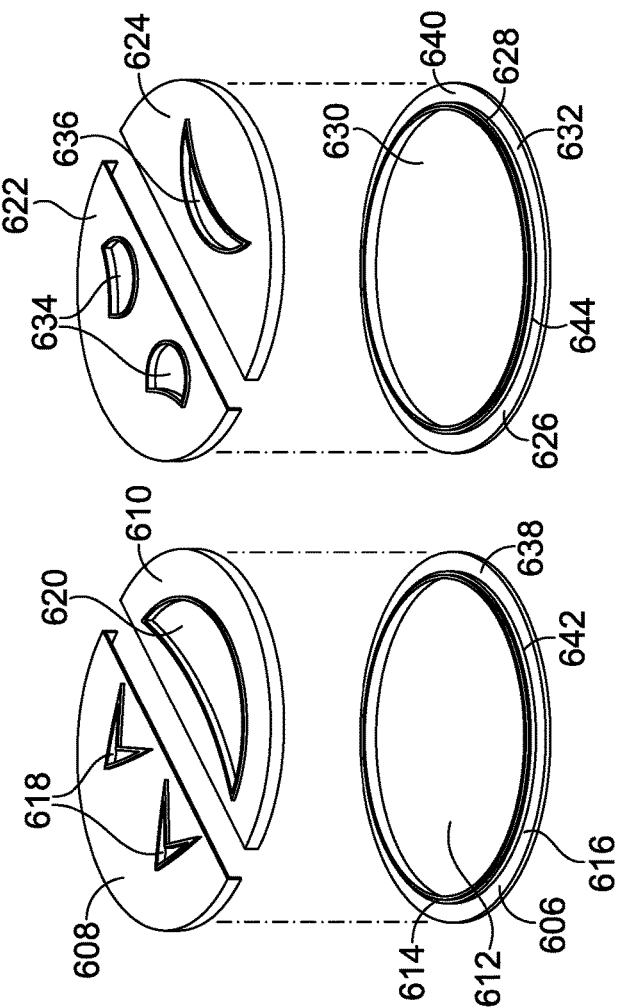
FIG. 6A
FIG. 6B

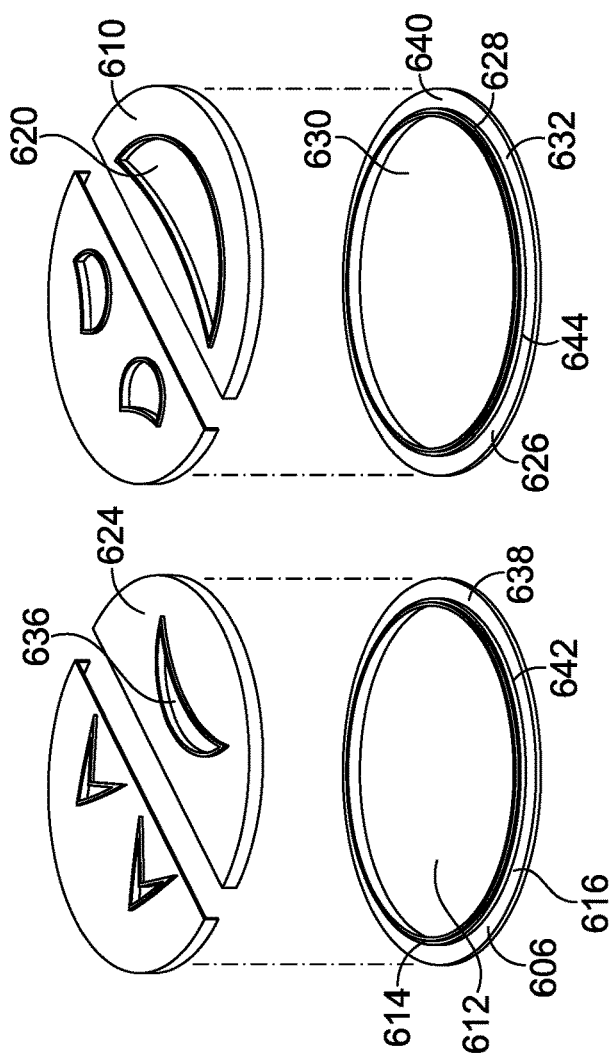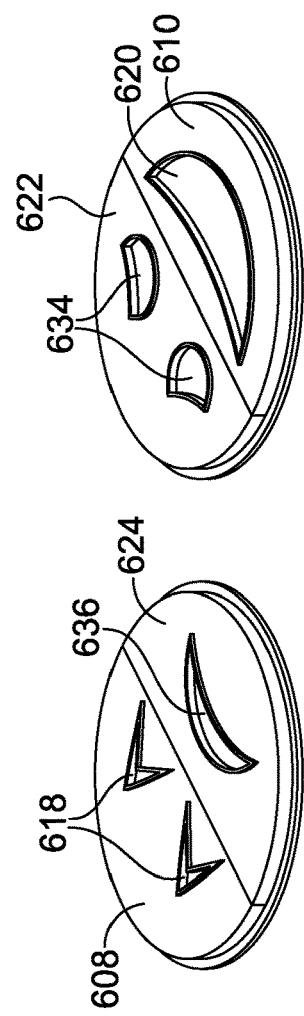
FIG. 6C
FIG. 6D

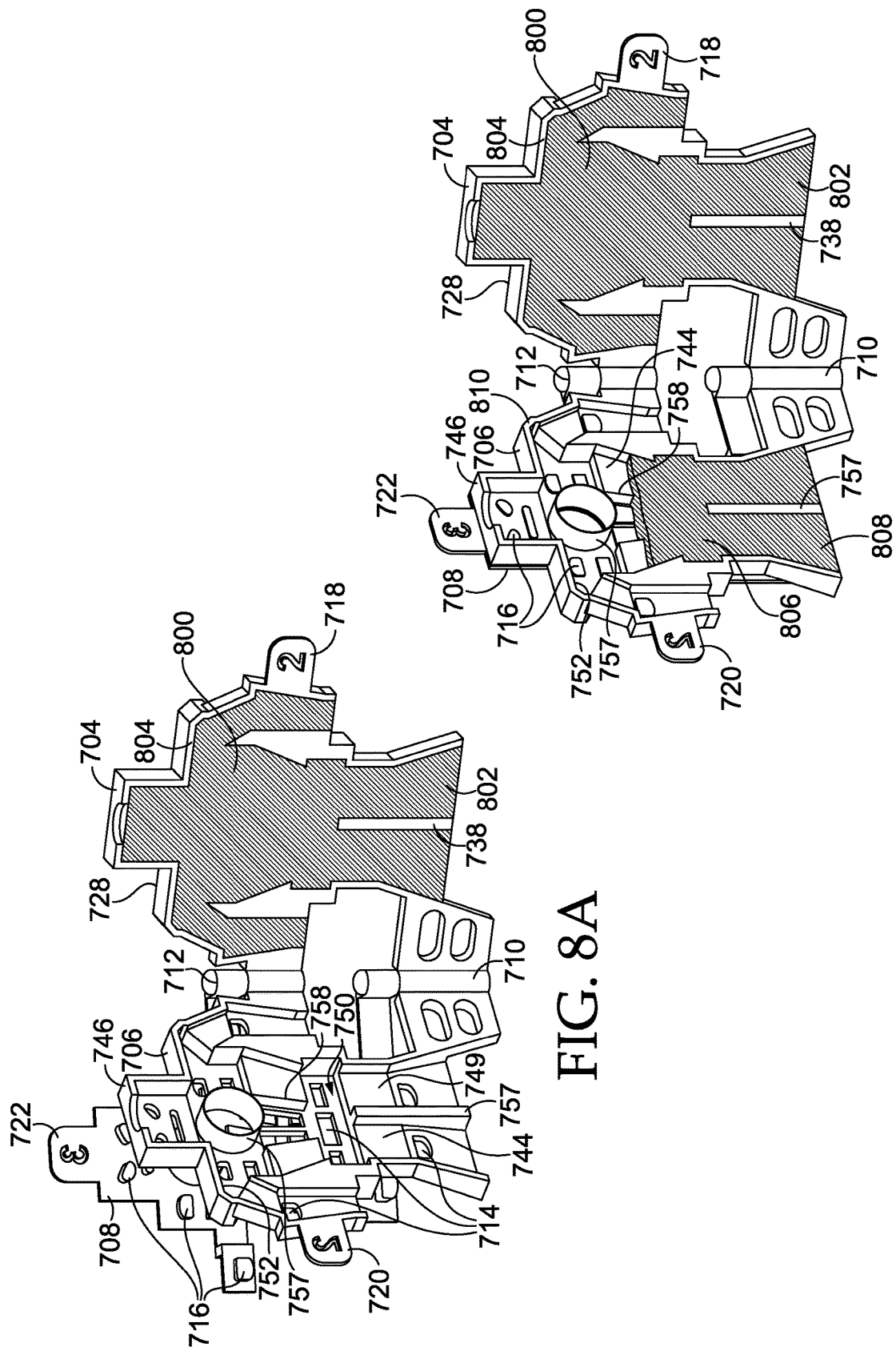

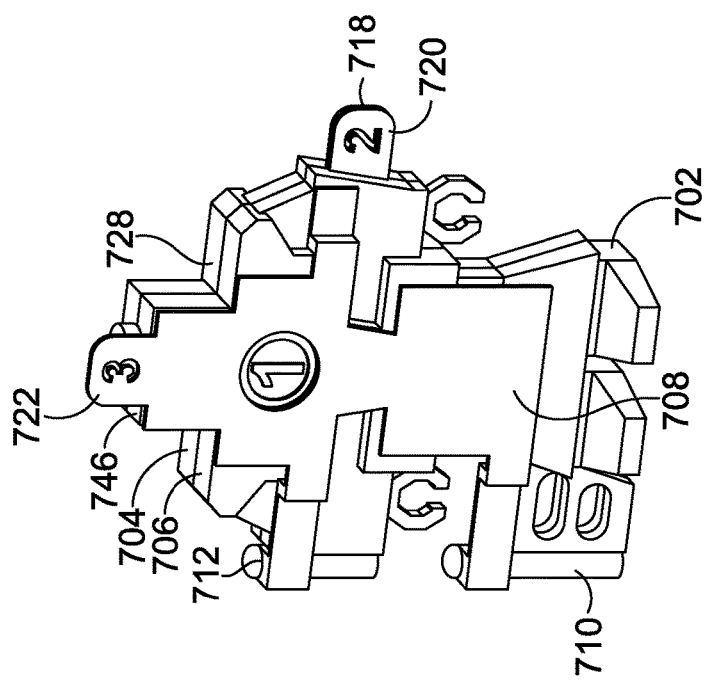
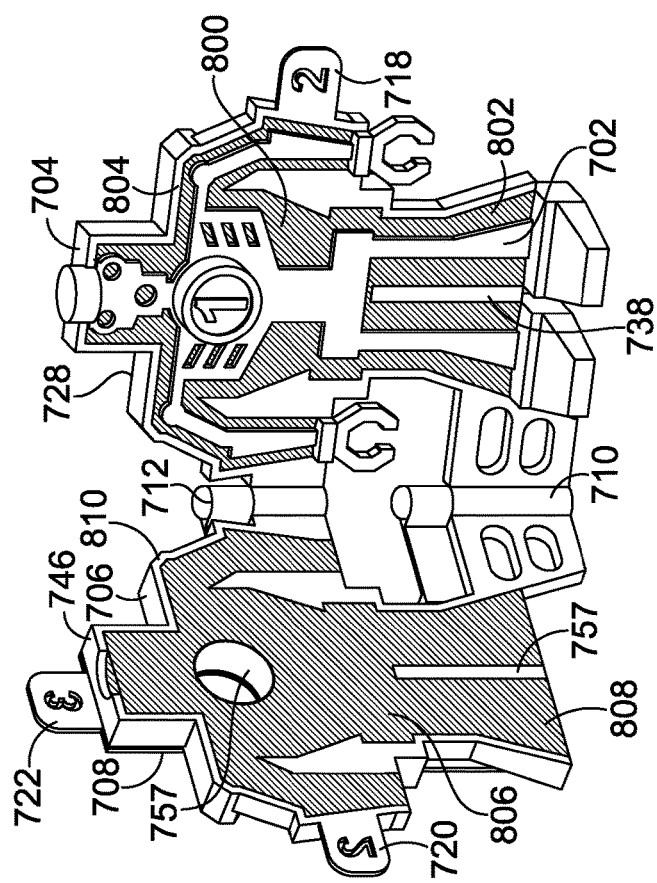
FIG. 8C
FIG. 8D

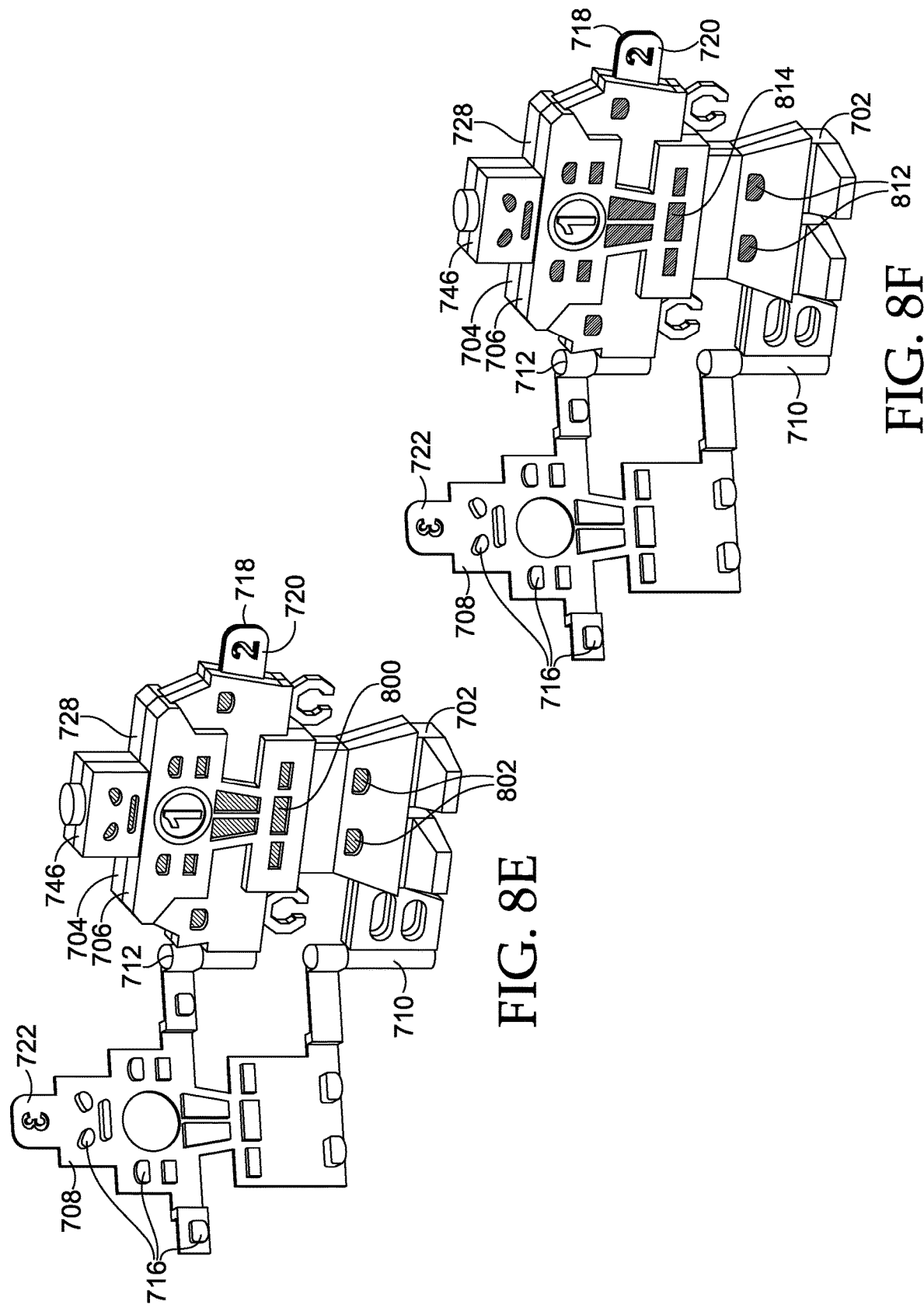

STACKABLE/NESTING STENCIL OR MOLD SYSTEM FOR MODELING COMPOUND

CROSS-REFERENCE TO RELATED APPLICATIONS

This U.S. application Ser. No. 16/444,387, entitled "Stackable/Nesting Stencil Or Mold System For Modeling Compound," and filed Jun. 18, 2019, claims the benefit of priority of U.S. Prov. App. No. 62/686,483, entitled "Stackable Stencil Or Mold System For Modeling Compound," and filed Jun. 18, 2018. The entirety of the aforementioned application is incorporated by reference herein.

STATEMENT REGARDING FEDERALLY SPONSORED RESEARCH OR DEVELOPMENT

Not applicable.

TECHNICAL FIELD

Aspects of the technology described herein relate to a multi-dimensional, stackable/nesting stencil or mold system for use with natural or synthetic modeling compound materials such as dough, clay, and the like.

BACKGROUND

Traditionally, users manipulate a modeling compound material of choice to form different shapes either by free forming, or by using a mold or cutting device such as, for example, cookie cutters, scissors, and the like. The different molded or cut shapes are cut out or molded independent from one another and may be further manipulated by the user in a free hand manner, or in other words, the molded or cut shapes are utilized how the user envisions without the assistance of any devices, thereby yielding different creations formed from one or more modeling compound materials. Because of the free-hand assembly and in some cases molding of the modeling compound, it is difficult to repeatedly form a creation in a uniform and consistent manner.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The technology described herein generally relates to a system of multi-dimensional, stackable/nesting stencils or molds for use with modeling compound materials.

The technology described herein is directed to a system of multi-dimensional, stackable/nesting stencils or molds for use with modeling compound materials and a method of using the system of stackable/nesting stencils and/or molds with modeling compound materials. The system of stackable/nesting stencils or molds, in accordance with aspects herein, generally comprises a set of stencils and/or molds that stack on top of each other to aid a user in the formation of distinct three-dimensional (3-D) creations using modeling compound materials in a uniform and consistent manner. The creations may be 3-D objects, having one surface where the design or image may be recognized. In other words, the 3-D object may comprise a layered construction where the layers of modeling compound may be gradually stacked along a z-direction onto a planar surface extending along an x-y plane with the guidance of the multi-dimensional stackable/nesting stencils described herein, and with each layer providing greater detail to the 3-D object.

In other aspects, a 3-D object may have a multi-dimensional arrangement where the design or image may be recognized, such as a 3-D object having two or more surfaces with a recognizable image or body, formed with the guidance of the multi-dimensional stackable/nesting stencil molds in accordance with aspects herein. The system of stackable/nesting stencils and/or molds may be provided in kits. Each stencil in a kit may be configured to guide a user with formation of the 3-D object(s) in accordance with aspects herein.

In one aspect, the system of stackable/nesting stencils and/or molds may be comprised of hinged or standalone molds and/or stencils that can be optionally used with an armature core piece. In another aspect, each of the molds and/or stencils in each kit may be configured to align with a subsequent nesting mold and/or stencil in the kit. Additionally, each mold and/or stencil in the kit may be marked or numbered for guiding the user in the correct order in which to fill each of the molds and/or stencils with the modeling compound material.

The systems of stackable/nesting stencils and/or molds in accordance with aspects herein may be configured to yield creations such as molded representations of popular characters, vehicles, objects, toys, animals, dolls, figurines, pictures, landscapes, and the like. For example, a kit of stencils and/or molds may be provided to create a 3-D object representing, for example, a flower vase with flowers, with multi-dimensional molded components in a series of layers, or another exemplary set may be provided for creating a 3-D object of a character having a first layer shaped with a first stencil, the first layer having a first series of features, a second subsequent shaped layer with a second subsequent stencil, the second layer having a second series of features complementary to the first layer, and so on, as needed. In another aspect, a set with an armature core may be provided for creating a 3-D object such a robot figurine, a character figurine, and the like.

In accordance with an aspect herein, the 3-D objects in accordance with aspects herein are multi-section and/or multi-level, yielding a layered structure that displays a recognizable image on at least one surface, as in a bas-relief. The 3-D objects in accordance with aspects herein can be formed by stacking layers of one or more modeling compound materials with the guidance of the stackable/nesting stencil and/or mold system, described herein. The stencils in each kit, in accordance with aspects herein, for example, are configured to nest/telescope over each other in a particular order and in some instances, may interlock with each other so that the modeling compound end product is always reproducible, one layer at a time. In other words, each stencil in the kit may be comprised of a nesting plate having one or more shaped openings for filling with a modeling compound material. The one or more shaped openings in each nesting plate are different from one another, each nesting plate in the kit being used to shape the modeling compound into a particular aspect of the final 3-D object.

For example, a set of nesting stencil plates may be provided for making a 3-D object of a character, image, or body. The first nesting stencil plate in the set may be a base stencil plate that comprises a first opening defined by a lip for forming a base layer of the 3-D object. The second nesting stencil plate in the set may comprise one or more second openings for forming the second layer of the 3-D object and for defining further aspects of the 3-D object. The third nesting stencil plate in the set of nesting stencil plates may comprise one or more third openings for forming the third layer of the 3-D object and for defining further aspects of the 3-D object and/or for placing further detail to the 3-D object. Depending on the level of complexity desired in the creation of the 3-D object, the number of plates in a set/kit may be varied. A similar sequence to the set of nesting stencil plates may also be followed for the molds used for forming 3-D objects. Aspects herein will become more apparent with reference to the figures, as described below.

The 3-D objects can be placed on a poster board backing while filling the stencil sets with the compound material, which may provide a base for the 3-D object, and may help dry the compound material faster. The 3-D object can be glued onto the poster board backing and can then be placed into a plastic frame for displaying. Alternatively, a post may be pressed onto the 3-D object while it is still soft so that the 3-D object can be hung from a string when the 3-D object dries and hardens, for example.

The technology described herein also relates to a system of hinged or standalone molds that can be optionally used with an armature core. Further, the molds can be provided in a set similar to the nesting stencils described above. In accordance with aspects herein, the main mold may be comprised of two complementary molds. Each of the complementary molds may be filled with a modeling compound material and the armature may be pressed into a first mold of the complementary molds and the second mold may be fitted onto the first mold such that the armature may be placed between the modeling compound material in the first mold and the second mold. One or both of the first mold and/or the second mold may further comprise openings that may be sealed by a capping component when the first mold and/or the second mold are being filled with the modeling compound material. Once the first and second mold are fitted onto each other, the capping component may be opened to expose the openings, where more modeling compound material may be added to each opening to add detail to the molded 3-D object. Finally, the finalized 3-D object may be removed from the molds. In accordance with aspects, the finalized 3-D object may be a figurine of a character, a vehicle, a robot, or any other object 3-D object.

BRIEF DESCRIPTION OF THE SEVERAL VIEWS OF THE DRAWINGS

The technology described herein is described in detail below with reference to the attached drawing figures, wherein:

FIG. 1A depicts an exemplary stacking/nesting stencil system for creating a 3-D object from a modeling compound material, the system comprising a plurality of nesting stencil plates, in accordance with aspects herein;

FIG. 1B depicts the exemplary stacking/nesting stencil system shown in FIG. 1A in a nested configuration, in accordance with aspects herein;

FIG. 2A depicts a cross-section of the exemplary stacking/nesting stencil system shown in FIG. 1A along the line 2A-2C in FIG. 1A, in accordance with aspects herein;

FIG. 2B depicts a nested configuration of the first two nesting stencil plates of the cross-section of the exemplary system shown in FIG. 2A, in accordance with aspects herein;

FIG. 2C depicts a nested configuration of all nesting stencil plates of the cross-section of the exemplary system shown in FIG. 2A, in accordance with aspects herein;

FIGS. 3A-3I depict steps for creating a 3-D object from a modeling compound material using the exemplary stacking/nesting stencil system shown in FIGS. 1A-2C, in accordance with aspects herein;

FIGS. 6A-6F depict a kit with multiple systems, each system comprising a plurality of interchangeable nesting stencil plates, in accordance with aspects herein;

FIGS. 8A-8H, depict steps for creating a 3-D object from a modeling compound material using the exemplary stencil and/or mold system shown in FIGS. 7A-7C, in accordance with aspects herein.

DETAILED DESCRIPTION

Figure 3C:
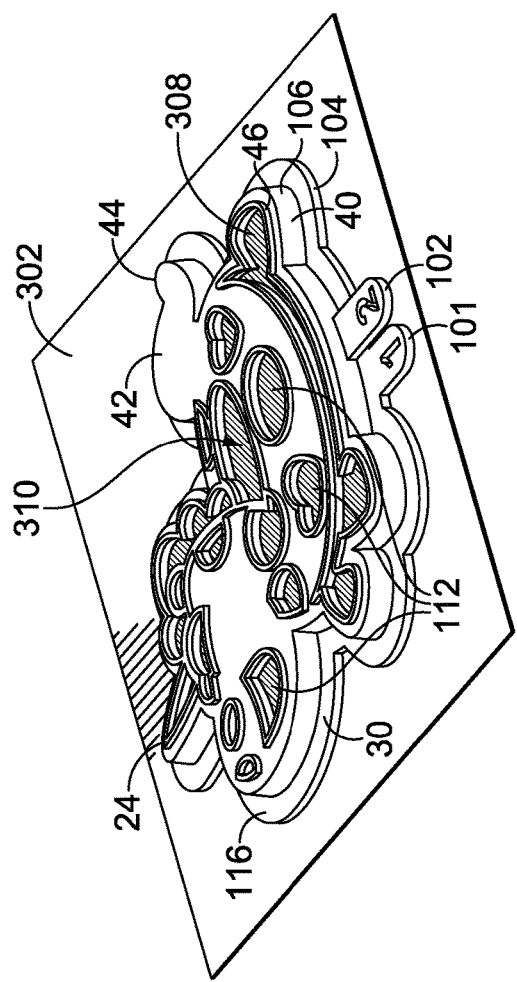

Aspects of the technology described herein will become more apparent with reference to the figures provided herein.

FIG. 1A depicts an exemplary stackable/nesting stencil system 100 for forming a 3-D object of a unicorn character, the system comprising a plurality of nesting stencil plates including a first stencil plate 104, a second stencil plate 106, and a third stencil plate 108. Although the exemplary stackable/nesting stencil system 100 is shown as having three stencil plates, it is contemplated that the stackable/nesting stencil systems in accordance with aspects herein may be comprised of any number of nesting stencil plates suitable for the particular recognizable character, image, or body being formed from a modeling compound material. As shown at FIG. 1A, each nesting stencil plate may comprise a sequence indicator to guide a user in the order in which the nesting stencil plates should be assembled together. As shown, the sequence indicators may be physical numbered tabs. For example, the first stencil plate 104 (i.e., the base plate) comprises numbered tab 101 provided with a number "1" to indicate that an opening 110 of the first stencil plate 104 should be filled with the modeling compound material, first. The second stencil plate 106 comprises numbered tab 102 provided with a number "2" to indicate that each of the opening(s) 112 of the second stencil plate 106 should be filled with the modeling compound material, second. And, the third stencil plate 108 comprises numbered tab 103 provided with a number "3" to indicate that each of the opening(s) 114 should be filled with the modeling compound material, last. Further as shown, the openings 114 are configured to align with one or more portions of the openings 112, and the openings 112 are configured to align with one or more portions of the opening 110 so that a third layer of modeling compound material filled in the openings 114 is stacked on a second layer of modeling compound material filled in openings 112, and so that a second layer of modeling compound material filled in the openings 112 is stacked on a first layer of modeling compound material filled in the opening 110.

As further shown in FIG. 1A, the base plate 104 may comprise a base contour portion 116 having an upper surface 30 and a lower surface 32 (shown in FIG. 3I), defining a shape of the first stencil plate 104, wherein the lower surface 32 is configured to be in contact with a backing surface which can be a cardboard piece, a working surface of a table, a paper, a wood piece, and the like, onto which the 3-D object formed from the modeling compound material may be formed. Further, the first stencil plate 104 may comprise a raised lip portion 120 upwardly extending from the upper surface 30 of the base contour portion 116 outlining the opening 110 of the first stencil plate 104.

As it can be further observed from FIG. 1A, the base contour portion 116 may comprise a thickness 10 (e.g., ranging from 0.3 to 2.0 mm, from 0.3 to 1.5 mm, from 0.3 to 1.0 mm, and the like), and the raised lip portion 120 may comprise a height 28 measured from the upper surface 30 of the base contour portion 116 to an upper edge 14 (e.g., ranging from 3.0 to 5.7 mm, from 3.5 to 5.5 mm, from 4.0 to 5.5 mm, from 4.6 to 5.3 mm, and the like) of the raised lip portion 120. The interior surface 22 of the raised lip portion 120 may present an even and smooth surface having a height 16 composed of the thickness 10 of the base contour portion 116 plus the height 28 (e.g., from 4.7 to 6.0 mm, from 5.0 to 6.0 mm, from 5.3 to 5.8 mm, from 5.6 to 6.0 mm, and the like) of the raised lip portion 120. The exterior surface 36 of the raised lip portion 120 may also be smooth, or alternatively, may comprise a plurality of ledges 38 (i.e., adding a flange portion to an upper edge of the raised lip portion 120). The thickness of the flange portion may range from 0.50 to 1.3 mm high, from 0.508 to 1.27 mm high, from 0.5 to 1.2 mm high, and the like, which is smaller than the thickness of the raised lip portion 120, to create a break in the contacting surface between the exterior surface of the raised lip portion 120 and an interior surface of a subsequent nesting plate, as shown. The ledges 38 may prevent subsequent nesting stencil plates from "sticking" and making it hard to separate the nesting stencil plates once the finalized 3-D object is formed from the modeling compound material. As another option, the exterior surface 36 of the raised lip portion 120 may be slightly angled inward (draft angle between 3° and 7°, between 4° and 6°, between 4° and 5° (not shown)) so that an interior surface of a subsequent stencil plate is not in direct contact with the exterior surface 36 of the raised lip portion 120.

Continuing with FIG. 1A, the second stencil plate 106 may comprise a lower surface 204 (shown in FIG. 2A) and an upper surface 42, with a flange portion 40 extending downwardly from the perimeter edge 44 of the second stencil plate 106, thereby giving the second stencil plate 106 a depth 208 (shown in FIG. 2A), comprised of the height 210 of the flange portion 40 less the thickness 206 of the second stencil plate 106. Further, the second stencil plate 106 may comprise openings 112. Each opening 112 may optionally have a flange portion 46 outlining each opening 112 and upwardly extending from the upper surface 42 of the second stencil plate 106. The flange portion 46 may aid in providing separation between an interior surface of a subsequent nesting stencil plate to prevent "sticking" so that the nesting stencil plates in the system can be easily separated from each other when the 3-D object is completed. As will become more apparent from FIG. 1B and FIG. 2B, the second stencil plate 106 is configured to envelop the opening 110 and the raised lip portion 120 of the first stencil plate 104. Particularly, an interior surface 212 of the flange portion 40 is configured to engage the exterior surface 36 of the raised lip portion 120 of the first stencil plate 104, as shown in FIG. 2B. Thus, the height 210 of the flange portion 40 may include the thickness 206 (e.g., ranging from 0.3 to 2.0 mm, from 0.3 to 1.5 mm, from 0.3 to 1.0 mm, and the like), which may be the same as the thickness 10 of the base contour portion 116 of the first stencil plate 104 plus the height 28 of the raised lip portion 120.

Continuing on with FIG. 1A, the third stencil plate 108 may comprise a lower surface 214 (shown in FIG. 2A) and an upper surface 48, with a flange portion 50 extending downwardly from the perimeter edge 52 of the third stencil plate 108, thereby giving the third stencil plate 108 a depth 222 (shown in FIG. 2A), comprised of the height 224 of the flange portion 50 less the thickness 218 of the third stencil plate 108. Further, the third stencil plate 108 may comprise openings 114. Each opening 114 may optionally comprise a flange portion 118, as in the first stencil plate 104 or the second stencil plate 106, however, since this is the final stencil plate in the particular exemplary stackable/nesting stencil system 100, the flange portions outlining the openings 114 are not necessary since no separation needs to be created between the third stencil plate 108 and a subsequent stencil plate.

As will become more apparent from FIG. 1B and FIG. 2C, the third stencil plate 108 is configured to envelop the openings 112, the flange portions 46, and the flange portion 40 of the second stencil plate 106. Particularly, an interior surface 220 of the flange portion 50 is configured to engage the exterior surface 213 of the flange portion 40 of the second stencil plate 106, as shown in FIG. 2C. Thus, the height 224 of the flange portion 50 may include the thickness 218 (e.g., ranging from 0.3 to 2.0 mm, from 0.3 to 1.5 mm, from 0.3 to 1.0 mm, and the like), which may be the same as the thickness 10 of the base contour portion 116 and the thickness 206 of the second stencil plate 106, plus the height 210 of the flange portion 40, plus the height 18 (ranging from 0.5 to 1.5 mm, from 0.7 to 1.4 mm, from 0.9 to 1.4 mm, from 1 to 1.3 mm, and the like) of each flange portion 46 measured from the upper surface 42 to upper edge 24 of each flange portion 46. Thus, the final stencil plate in each system is configured to enclose all previous stencil plates. In other words, as shown in FIG. 1B, the third stencil plate 108 encloses both the second stencil plate 106 and the first stencil plate 104, while the second stencil plate 106 encloses the first stencil plate 104. Further, as also shown in FIG. 1B, the numbered tabs indicating the sequence of the stencil plates in the exemplary stackable/nesting stencil system 100, when provided, may be provided in an offset manner, as shown, so that the numbered tab 101 does not directly overlap with the numbered tab 102 or the numbered tab 103, and so that the numbered tab 103 does not directly overlap with the numbered tab 102 or the numbered tab 101. This works for both aesthetics and functionality in providing a user a place to grip and lift each stencil plate in the exemplary stackable/nesting stencil system 100 after completing the 3-D object guided by the exemplary stackable/nesting stencil system 100.

Moving on to FIGS. 3A-3I, steps for creating a 3-D object 300 using the exemplary stackable/nesting stencil system 100 described in FIGS. 1A-2C, are depicted. As shown in FIG. 3A, the first stencil plate 104 may be placed on a flat surface 302 such as a piece of board, as shown. It is contemplated that the flat surface may be provided by any type of material such as plastic, cardboard, paper, and the like. However, this is optional as it can be recognized that a table surface, a mat surface, a counter surface, and the like, that is stationary, is also an acceptable surface, in accordance with aspects herein. As shown, the first stencil plate 104 is placed on a flat surface 302 having the raised lip portion 120 facing away from the flat surface 302, so that a lower surface 32 (shown in FIG. 3I) of the base contour portion 116 of the first stencil plate 104 sits flush against the flat surface 302, thus sealing the opening 110 to create a molding cavity 306. Then, as shown in FIG. 3B, the molding cavity 306 may be filled with a first quantity of a modeling compound material to form a first layer 308 to completely fill the molding cavity 306. The upper surface 310 of the modeling compound material first layer 308 may be flattened using a roller (not shown) or alternatively, pushing or patting down with a user's hand, checking that the upper surface 310 of the modeling compound material first layer 308 is at the same level as the upper edge 14 of the raised lip portion 120.

Figure 3D:
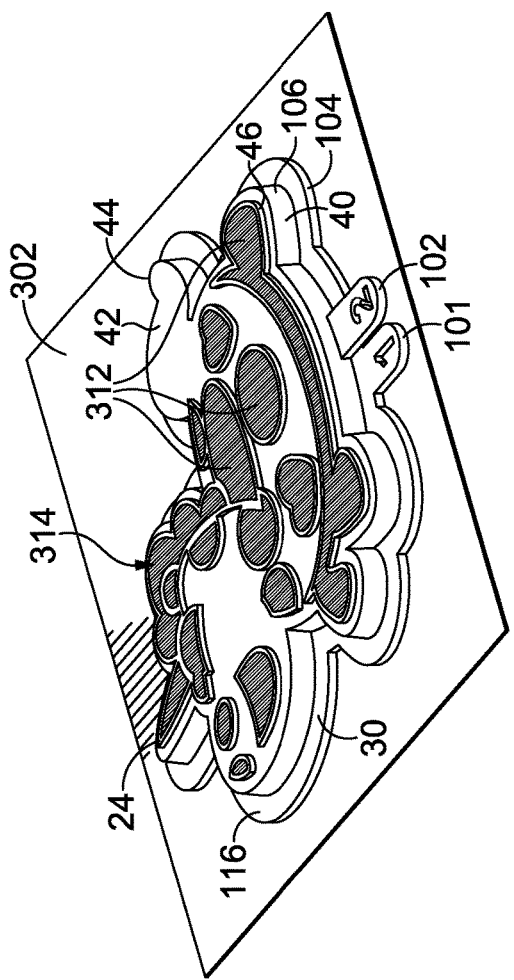

Moving onto FIG. 3C, a user may place the second stencil plate 106 over the first stencil plate 104 in alignment with the first stencil plate 104, as described above with reference to FIG. 2B. This will cause the exposure or visibility of the modeling compound material first layer 308 through the openings 112. As shown in FIG. 3C, the openings 112 allow the user to add a second quantity of the same or a different modeling compound material to form a second layer 312 over the visible portions of the upper surface 310 of the modeling compound material first layer 308 to layer the modeling compound(s) on one another to, for instance, add detail or decorations to the molded modeling compound material first layer 308, as shown in FIG. 3D. Using the same principle as when filling the molding cavity 306 of the first stencil plate 104, each of the openings 112 of the second stencil plate 106 may also be filled so that an upper surface 314 of the modeling compound material second layer 312 is level with an upper edge 24 of each flange portion 46 of the second stencil plate 106.

Figure 3G:
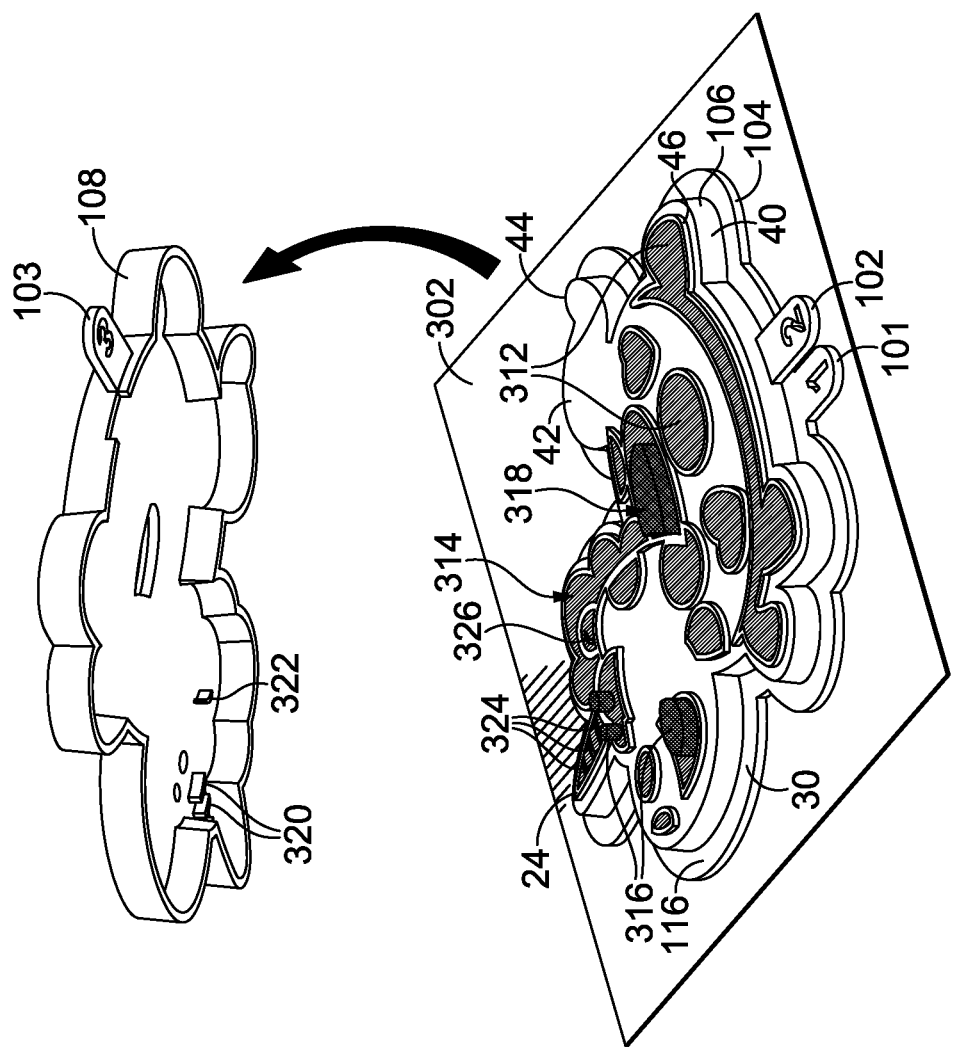
Figure 3H:
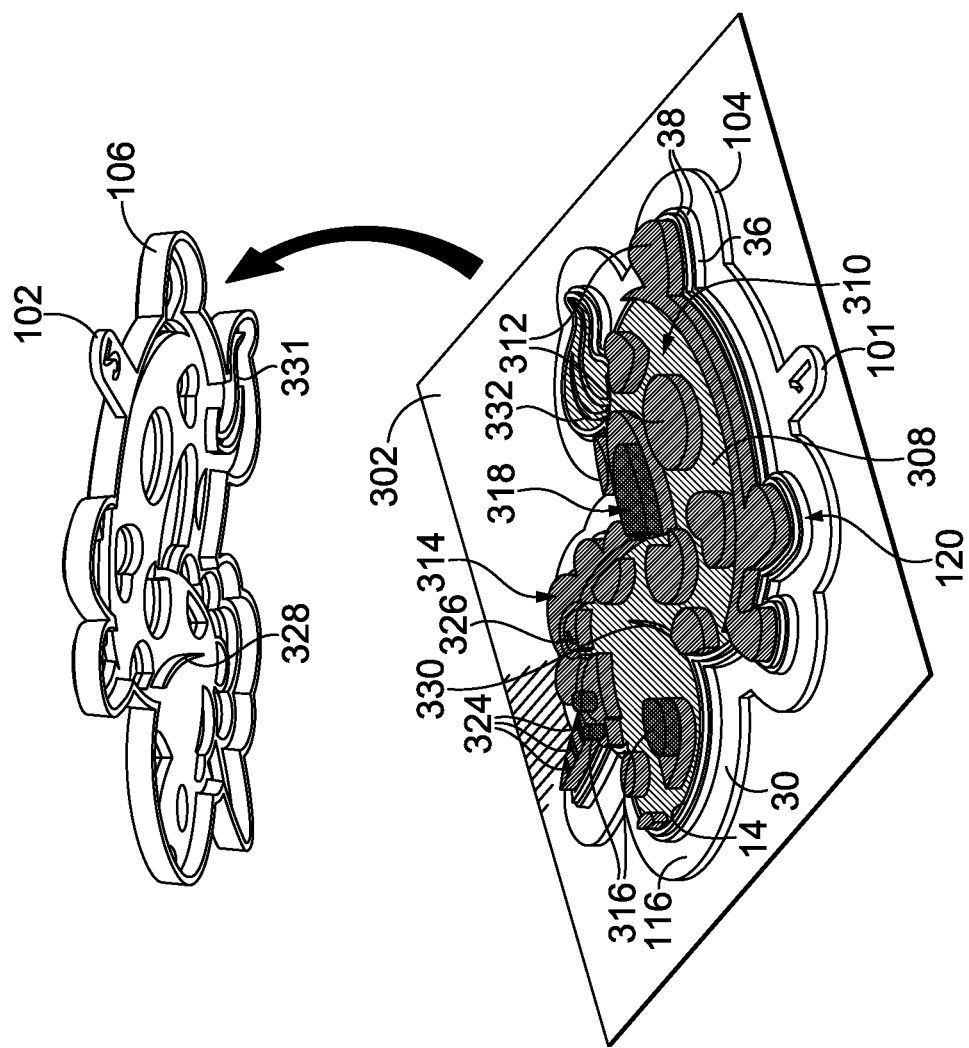
Figure 3I:
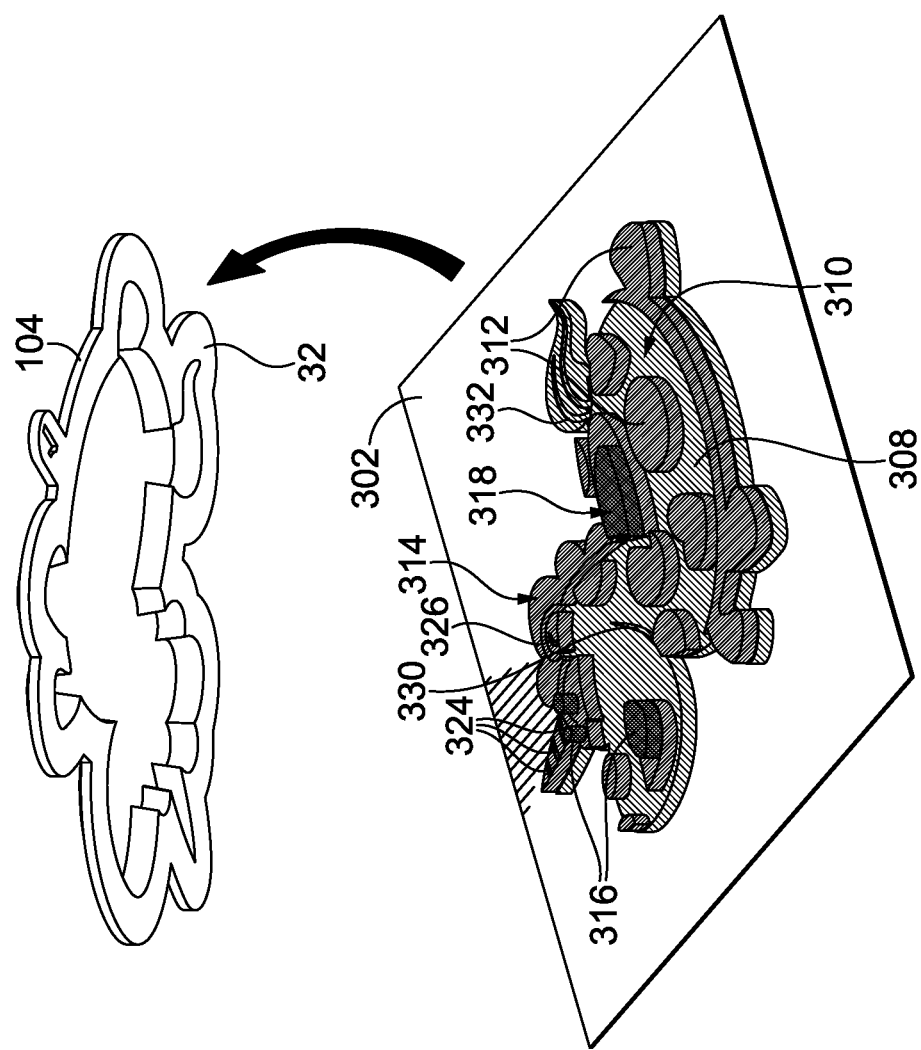

Subsequently, as shown in FIG. 3E, the final third stencil plate 108 may be placed onto the second stencil plate 106 that is nested with the first stencil plate 104, properly aligned as shown in FIG. 2C, so that openings 114 can also be filled with a third quantity of a modeling compound to form a third layer 316 so that an upper surface 318 of the modeling compound third layer 316 is level with the upper surface 48 of the third stencil plate 108 or so that the upper surface 318 of the modeling compound third layer 316 is level with an upper edge 119 of each flange portion 118, as shown in FIG. 3F. Once the openings 114 are filled and the modeling compound third layer 316 is leveled, the user may start the stencil removal process by first removing the third stencil plate 108, as shown in FIG. 3G, followed by removing the second stencil plate 106, as shown in FIG. 3H. As further shown in FIGS. 3G and 3H, the lower surface of the nesting stencil plates, in accordance with aspects herein, may comprise one or more protrusions to form indentations on the layer of modeling compound lying underneath. For example, the third stencil plate 108 may be equipped with protrusions 320 to form indentations 324 and protrusion 322 to form indentation 326 on the upper surface 314 of the modeling compound material second layer 312. Similarly, the second stencil plate 106 may be equipped with, for example, a protrusion 328 to form indentation 330, and one or more protrusions 331 to form one or more indentations 332 on the upper surface 310 of the modeling compound material first layer 308. The protrusions may, for example, extend from 0.50 to 1.3 mm out, from 0.508 to 1.27 mm out, from 0.5 to 1.2 mm out, and the like, from the lower surface 214 of the third stencil plate so that the indentations are clearly marked but do not compromise the integrity of the layer of the modeling compound material second layer 312 or beyond. Finally, as shown in FIG. 3I, the first stencil plate 104 may be removed to reveal the finalized 3-D object 300, which in this case is a portrait of a unicorn. In further aspects, while individual layers of modeling compound may be applied in sequential order to the organized layers of the stencil (i.e., compound inserted into the internal cavity and the surface openings of the first stencil plate 104, then the surface openings of the second stencil plate 106, and finally the surface openings of the third stencil plate 108), in some aspects, multiple stencil plates may be removed at the same time to reveal the compiled 3-D object having assembled, multi-dimensional molded characteristics. For example, a user may lift the first stencil plate 104 and remove all stencil plates at the same time because each stencil sequentially stacks onto the base contour portion 116 and, thus, can be pulled upwards together.

Figure 4A:
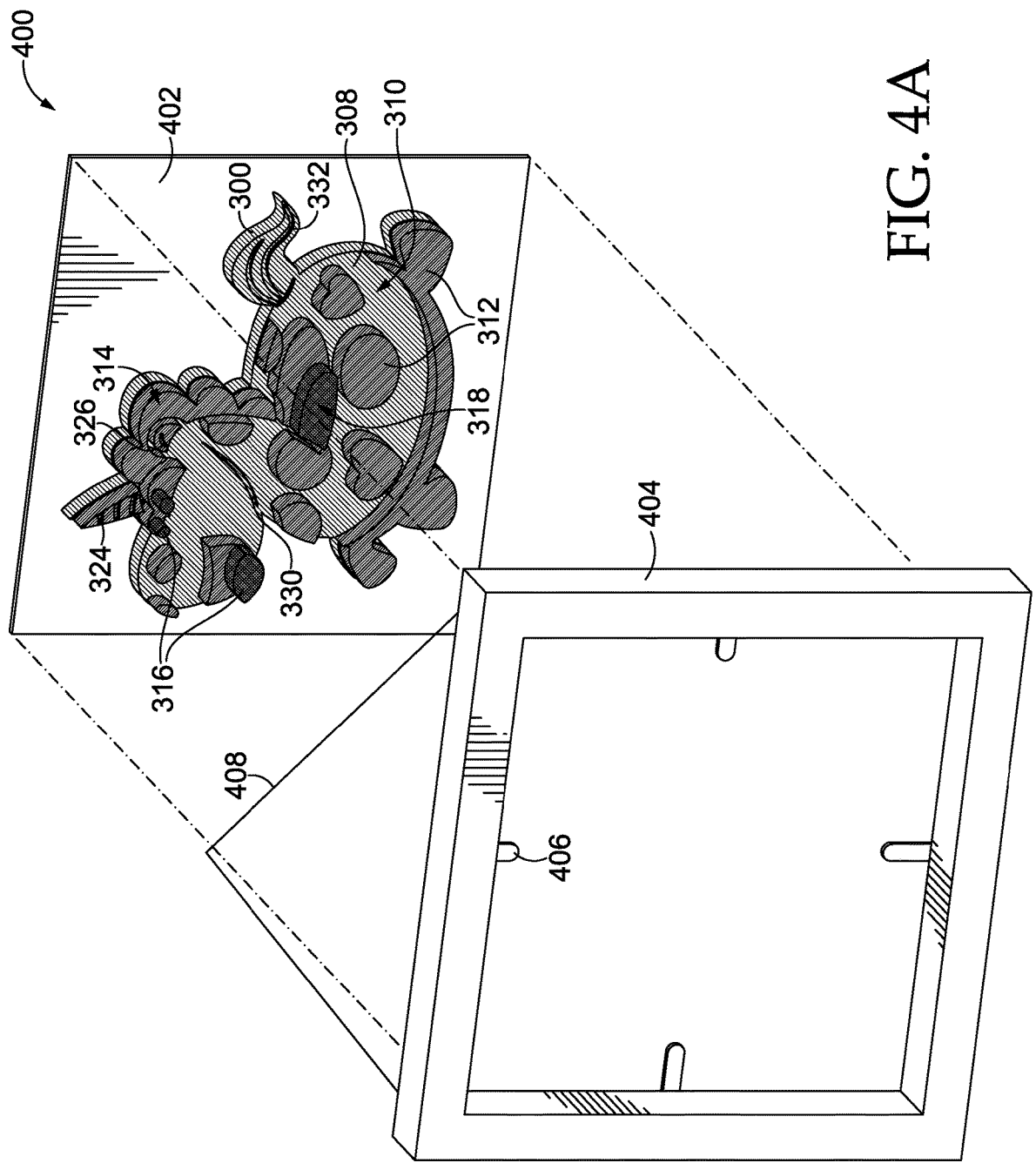
FIGS. 4A-4B depict a process for framing a 3-D object created from a modeling compound material, in accordance with aspects herein.
Figure 4B:
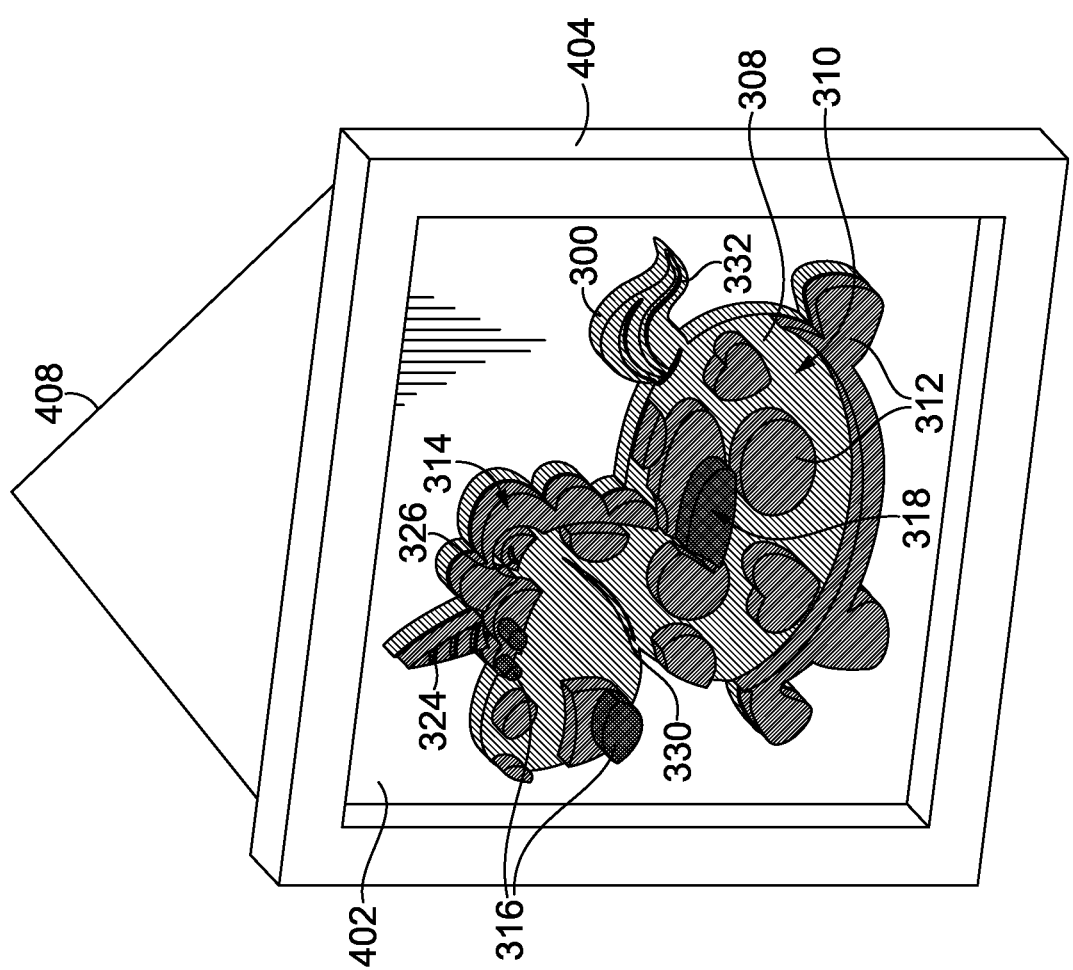

The 3-D objects created with the systems in accordance with aspects herein, may be prepared for display, as shown, for example, in FIGS. 4A and 4B. In some aspects, the modeling compound materials used in accordance with aspects herein may be configured to harden when dry (i.e., cured), such as clay-based materials, dough-based materials, or the like. As such, continuing with the exemplary system shown in FIGS. 1A to 3I, the finalized 3-D object 300 may be secured on to a backing material 402 (e.g., poster board, cardboard, glass, plastic, wood, and the like), as shown in the set-up 400 in FIG. 4A. It is contemplated that depending on the properties of the modeling compound material, the securing step may be performed prior to hardening of the modeling compound material, or after the hardening of the modeling compound material(s). The securing step may be performed by, for example, gluing the 3-D object 300 onto the backing material 402. Further, in accordance with aspects herein, the modeling compound material(s) may be provided in an array of color options so that the user may design the finalized 3-D object at each manipulation step, or alternatively, the modeling compound material(s) may be paintable and thus may be provided in a basic color (e.g., white), so that the user may choose to paint the finalized 3-D object as desired.

Continuing on with FIG. 4A, it is contemplated that the backing material 402 may be cut to size to fit into a designated frame 404. Once the finalized 3-D object 300 is secured to the backing material 402, the backing material 402 may be inserted into the designated frame 404 and may be secured to the frame by, for example, tabs 406, as shown, or any other means appropriate for securing the backing material 402 to the designated frame 404. Once the backing material 402 is secured to the designated frame 404, the framed finalized 3-D object 300 may be ready for display by hanging the frame via, for example, the string 408, or any other suitable means for displaying the framed finalized 3-D object 300, such as, for example, using an easel, providing a hanging loop, providing a stand, using an easel frame, and the like, as shown in FIG. 4B.

Figure 5B:
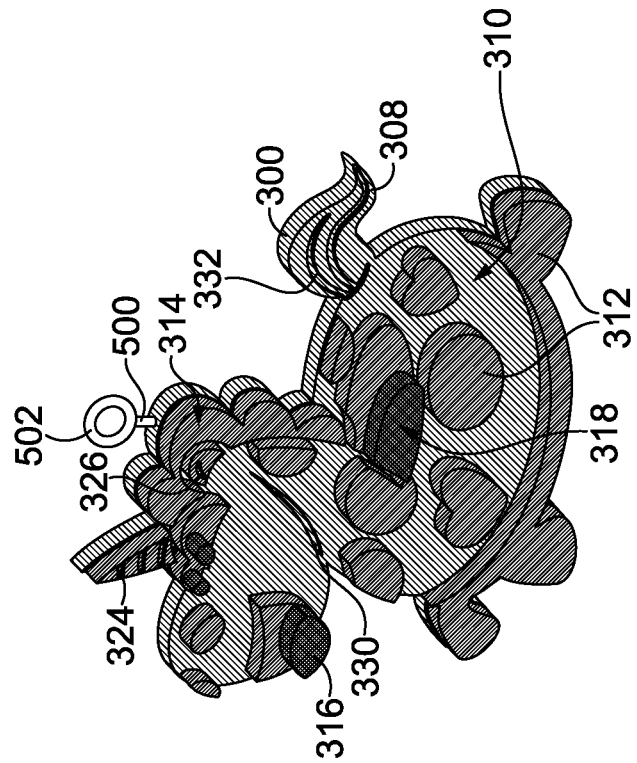
FIGS. 5A-5B depict a process for making a 3-D object created from a modeling compound material, in accordance with aspects herein.
Figure 5A:
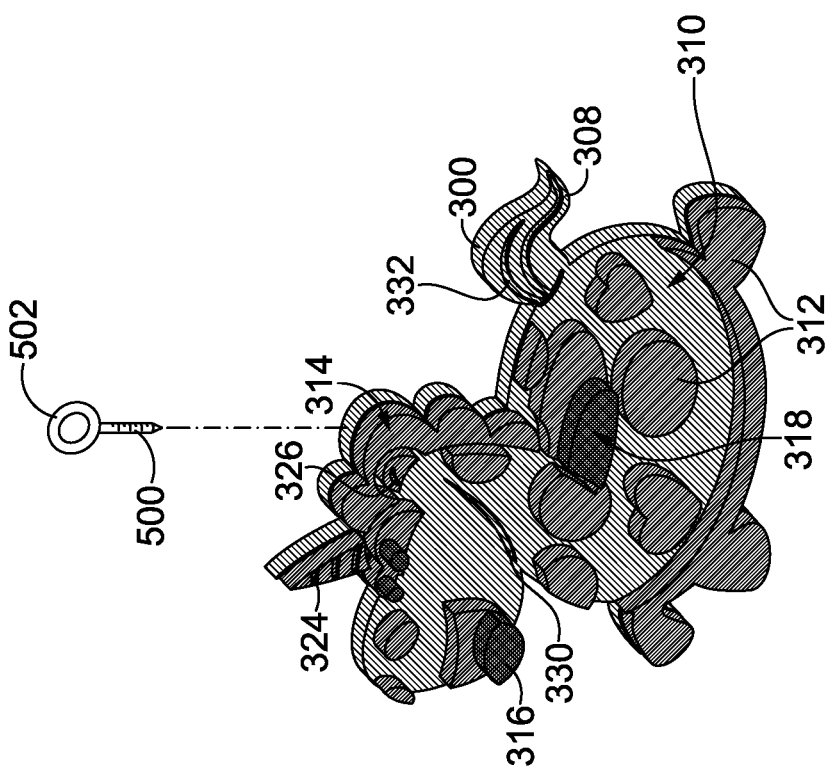

Alternatively, as shown in FIGS. 5A and 5B, a post 500 having a loop 502 may be provided. The post 500 may be pressed into the finalized 3-D object 300 while the modeling compound material first layer 308 is still moldable, as depicted in FIG. 5A. Then, once the finalized 3-D object 300 is cured by, for example, letting it dry with the post securely in place, as depicted in FIG. 5B, the loop 502 may be used for hanging the finalized 3-D object 300, for display.

It is contemplated that the systems for forming 3-D objects in accordance with aspects herein may be provided as kits including the backing material 402, the designated frame 404, and/or the post 500 having the loop 502 so that the users may choose how they would like to display their finalized 3-D objects.

Figure 6E:
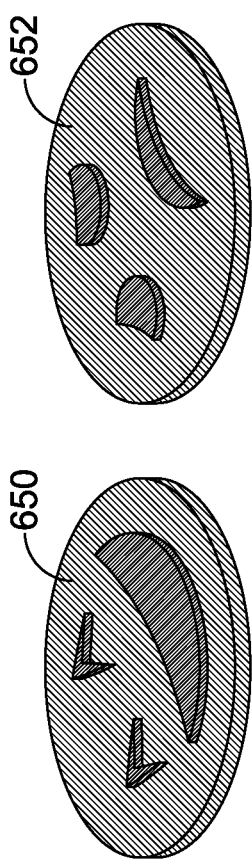

It is further contemplated that the kits may further include multiple systems that may have interchangeable stencil plates, as shown, for example, in FIGS. 6A-6F. In FIG. 6A, for example, an exemplary kit 600 containing a first stackable stencil system 602 and a second stackable stencil system 604 is shown, each having their respective stackable stencil plates, as shown in FIG. 6B. As shown, the first stackable stencil system 602 may comprise a first stencil plate 606 (i.e., a base plate) comprising a base contour portion 616 and a raised lip portion 614 upwardly extending from an upper surface 638 of the base contour portion 616, around a perimeter 642 of the opening 612, having similar dimensional properties as described above with reference to the construction of the first stencil plate 104 of exemplary stackable/nesting stencil system 100 in FIGS. 1A and 1B. Similarly, the second stackable stencil system 604 may comprise a first stencil plate 626 (i.e., a base plate) comprising a base contour portion 632 and a raised lip portion 628 upwardly extending from an upper surface 640 of the base contour portion 632, around a perimeter 644 of the opening 630.

Additionally, the first stackable stencil system 602 may comprise a second stencil plate 608 and a third stencil plate 610, where unlike the exemplary stackable/nesting stencil system 100, the second stencil plate 608 and the third stencil plate 610 are at the same level. The second stencil plate 608 may comprise openings 618, which in this case would serve to mold eyes of a finalized 3-D object, and the third stencil plate 610 may comprise opening 620, which in this case would serve to mold a mouth of a finalized 3-D object. Similarly, the second stackable stencil system 604 may comprise a second stencil plate 622 and a third stencil plate 624, where the second stencil plate 622 and the third stencil plate 624 are also at the same level. The second stencil plate 622 may comprise openings 634, which in this case would serve to mold eyes of a finalized 3-D object, and the third stencil plate 624 may comprise opening 636, which in this case would serve to mold a mouth of a finalized 3-D object.

Figure 6F:
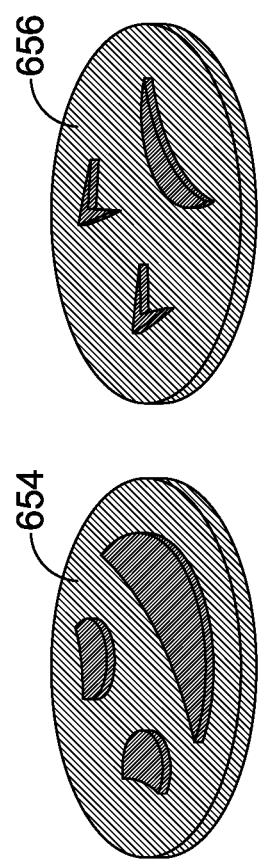

As shown in FIGS. 6C and 6D, the third stencil plate 610 may be interchangeable with, in this example, the third stencil plate 624 or, alternatively, the second stencil plate 608 may be interchangeable with the second stencil plate 622, to yield a different finalized 3-D object than originally intended by the first stackable stencil system 602 and by the second stackable stencil system 604, respectively. For instance, turning to FIG. 6E, the originally intended finalized 3-D object 650 when using the first stackable stencil system 602, and the originally intended finalized 3-D object 652 when using the second stackable stencil system 604, are shown. FIG. 6F shows the finalized 3-D object 654 and the 3-D object 656, which may be yielded from interchanging the second stencil plate 608 with the second stencil plate 622, or from interchanging the third stencil plate 624 with the third stencil plate 610.

Figure 7A:
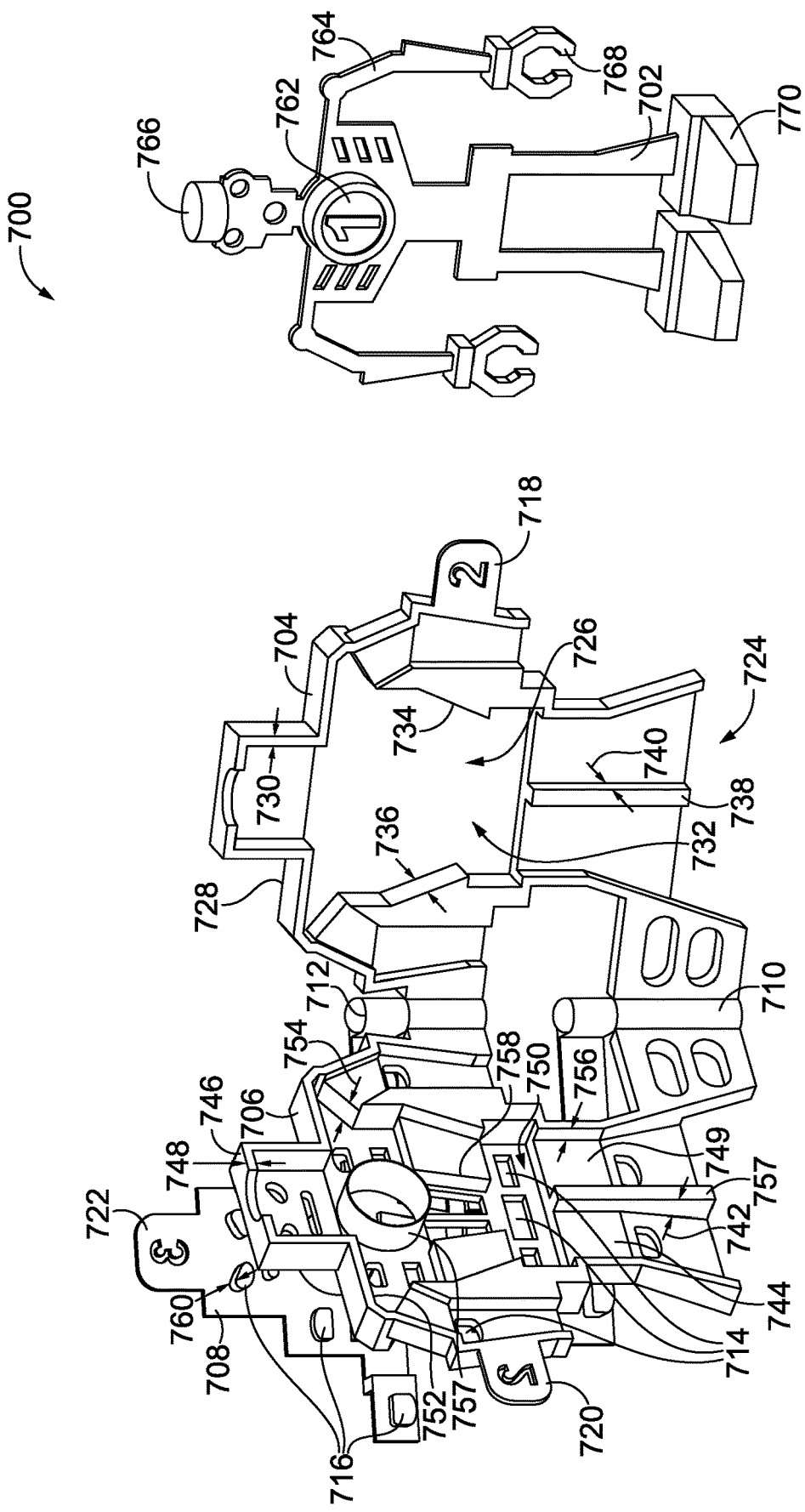
FIGS. 7A-7C depict an exemplary stencil and/or mold system for forming a 3-D object, in accordance with aspects herein.
Figure 7C:
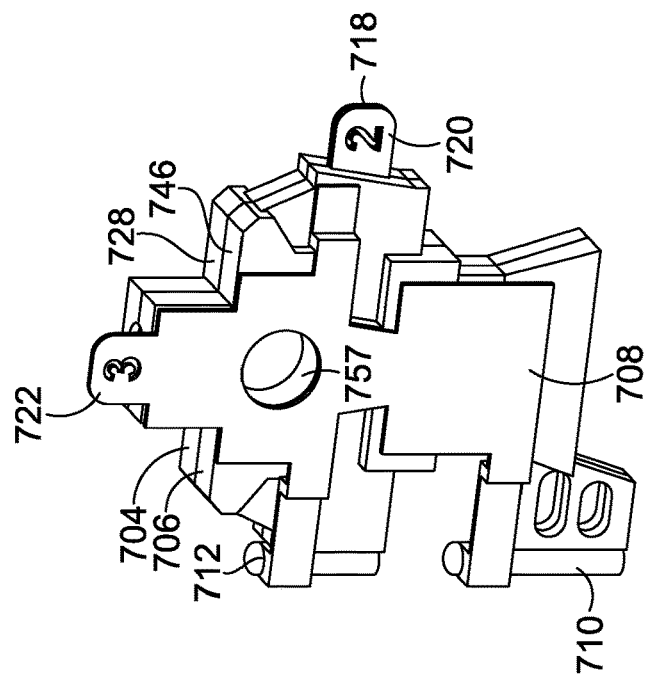
Figure 7B:
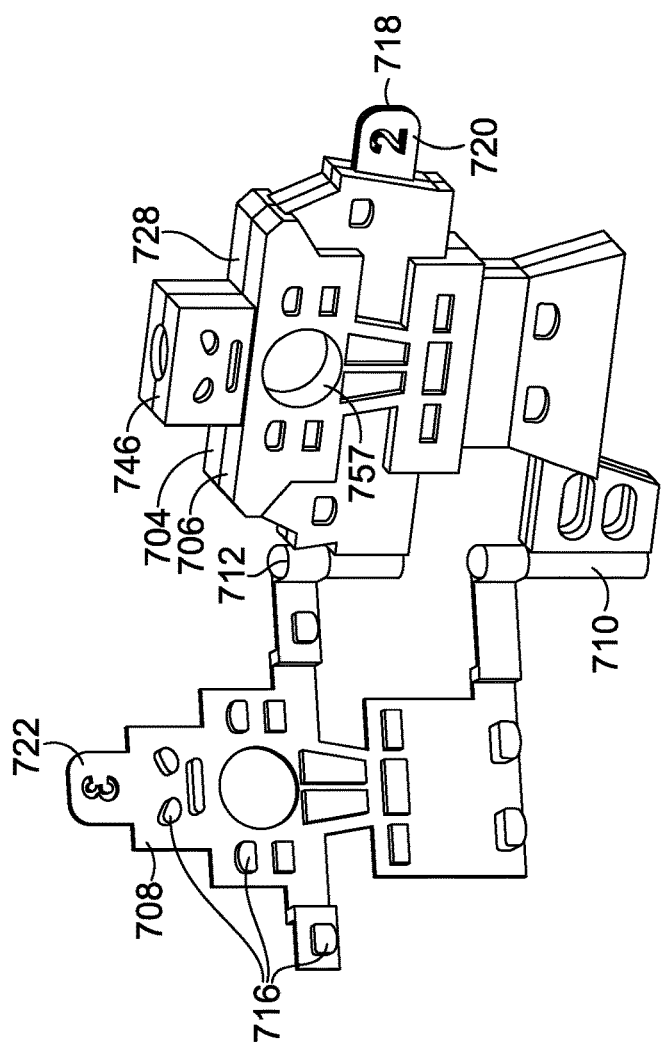

Turning now to FIGS. 7A-7C, FIG. 7A depicts an exemplary stencil and/or mold system 700 for forming a 3-D object. The stencil and/or mold system 700, as shown, may comprise an armature core component 702 to provide a skeletal structure and more stability to the 3-D object. Further, the exemplary stencil and/or mold system 700 may comprise a negative mold component 724 having a first mold component 704, a second mold component 706, and a cap component 708. The first mold component 704 may comprise a first inner surface 726 and a first outer surface 728 with a thickness 730 of the first mold component 704 defined between the first inner surface 726 and the first outer surface 728. The first inner surface 726 of the first mold component 704 may form a first molding cavity 732 having a first perimeter contour 734, a first depth 736 in one or more portions of the first molding cavity 732, and optionally a second depth 740 in other portions of the first molding cavity 732, as shown, depending on the features desired in the finalized 3-D object. Yet in other portions of the first molding cavity 732, the depth may not be constant but variable (visible with respect to second mold component 706 having portions with variable depth 742). Further, the first molding cavity 732 may comprise one or more protrusions 738 to provide division of the first molding cavity 732 (as shown). In other aspects, protrusions may also be provided to add further detail to the 3-D object in a similar way as the nesting stencil plates described above.

Continuing with FIG. 7A, the second mold component 706 may comprise a second inner surface 744 and a second outer surface 746 with a thickness 748 of the second mold component 706 defined between the second inner surface 744 and the second outer surface 746. The second inner surface 744 of the second mold component 706 may form a second molding cavity 750 having a second perimeter contour 752, a first depth 754 in one or more portions of the second molding cavity 750, optionally a second depth 756 in other portions of the second molding cavity 750, as shown, and optionally a variable depth 742 in other portions of the second molding cavity 750, depending on the features desired in the finalized 3-D object. Further, the second molding cavity 750 may comprise one or more protrusions 757 that may have one or more portions that are level with a contour edge 810, to provide division of the second molding cavity 750, or one or more protrusions 758 to provide indentations on a surface of the modeling compound to add further detail to the 3-D object (as shown, for example, in FIGS. 8G and 8H).

Further, the first mold component 704 and/or the second mold component 706 may be provided with one or more openings. For example, in FIG. 7A, the second mold component 706 is provided with a plurality of openings 714. Because a modeling compound material would ooze through the one or more openings when filling the second molding cavity 750 of the second mold component 706, a cap component 708 may be provided, having a plurality of protrusions 716 corresponding to each of the plurality of openings 714, for plugging each of the plurality of openings 714 while the second molding cavity 750 is being filled with the modeling compound material, as will become more clear with respect to FIG. 8B. It is contemplated that in order to provide a smooth surface to the second inner surface 744, a height 760 of each of the plurality of protrusions 716 may be substantially equal to the thickness 748 of the second mold component 706. In order to aid a user in the alignment of the first mold component 704 with the second mold component 706, the first mold component 704 and the second mold component 706 may be moveably connected to each other by an attachment component at one or more locations. For example, as shown in FIG. 7A, the first mold component 704 and the second mold component 706 may be moveably attached to each other at a first location by attachment component 710 and at a second location by attachment component 712. Further, as seen in FIG. 7B, the cap component 708 may also be moveably attached at the first location by attachment component 710 and at the second location by attachment component 712 in order to keep all components of the stencil and/or mold system 700 in proper alignment with one another, and prevent the loss of components by keeping them together at all times. The attachment components 710 and 712 may be comprised of pivot hinges, barrel hinges, spring hinges, case hinges, coach hinges, living hinges, and the like suitable for movably securing the first mold component 704 and the second mold component 706 to one another. It is to be noted that pivot hinges, barrel hinges, spring hinges, case hinges, coach hinges are terms of art for describing multi-element hinges having, for example, one element secured to the first mold component 704, and another element secured to the second mold component 706. In some aspects, when the first mold component 704 and the second mold component are made of a molded plastic or thermoplastic material, the different elements of the attachment components 710 and 712 may be integrally formed with the first mold component 704 or the second mold component 706, respectively. "Living hinge" is a term of art for a hinge that is integrally formed with and from the same material as the first mold component 704 and the second mold component 706, which in some aspects may comprise a different density that the first mold component 704 and the second mold component 706. Further, in order to aid the user in working with the stencil and/or mold system 700, each component may be provided with a numbered portion or numbered tab, such as portion 762 on the armature core component 702 numbered "1," numbered tab 718 on the first mold component 704 and numbered tab 720 on the second mold component 706 numbered "2," and numbered tab 722 on the cap component 708 numbered "3."

The proper alignment of the first mold component 704, the second mold component 706 and the cap component 708 of the stencil and/or mold system 700 can be seen with reference to FIGS. 7B and 7C. For example, in FIG. 7B, it can be seen that the first outer surface 728 of the first mold component 704 is flush and leveled with the second outer surface 746 of the second mold component 706, and that the numbered tab 718 and the numbered tab 720, respectively, are also flush and leveled so that in combination, they display the number "2" without any distortions. Further, FIG. 7C shows how the cap component 708 is also in proper alignment with the second mold component 706.

Figure 8H:
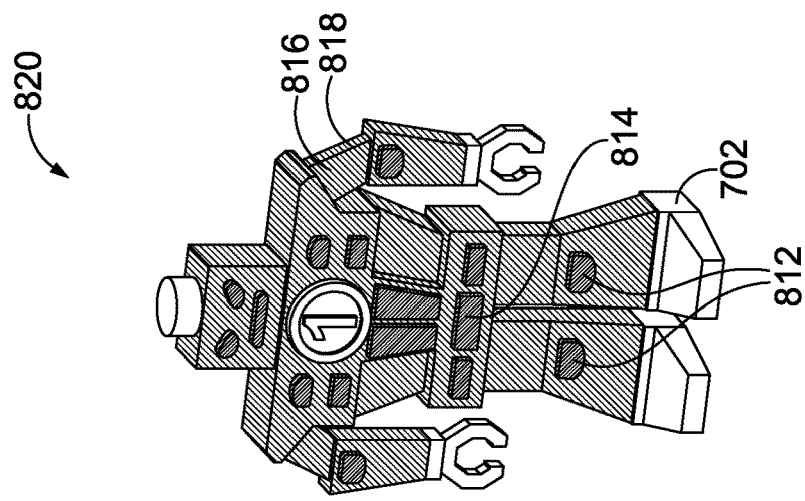

As can be observed in FIG. 7A, the armature core component 702 may be provided with a main body 764 and complementary features such as, in the exemplary stencil and/or mold system 700, the armature core component 702 is provided with a head cap portion 766, hand portions 768, and feet portions 770 that will complement the finalized 3-D object created with the exemplary stencil and/or mold system 700, as will become more apparent with respect to FIG. 8H.

Moving on to FIGS. 8A-8H, steps for creating a 3-D object 820 (as shown in FIG. 8H) using the exemplary stencil and/or mold system 700 described in FIGS. 7A-7C, are depicted. For example, as shown in FIG. 8A, the first step may include filling the first molding cavity 732 of the first mold component 704 with a first quantity of a modeling compound 800, making sure that an upper surface 802 of the modeling compound 800 is leveled with a contour edge 804 of the first mold component 704. The armature core component 702 may then be placed on top of the upper surface 802 of the modeling compound 800, as shown in FIG. 8C, or as shown in FIG. 8B, the second mold component 706 may be filled with a second quantity of a modeling compound 806 so that an upper surface 808 of the modeling compound 806 is leveled with a contour edge 810 of the second mold component 706, as can be further seen in FIG. 8C, making sure that the cap component 708 is engaged with the second mold component 706 so that the plurality of openings 714 of the second mold component 706 are plugged by the plurality of protrusions 716 of the cap component 708. Once both of the first mold component 704 and the second mold component 706 are filled with respective quantities of modeling compound 800 and 806, and once the armature core component 702 is placed on the upper surface 802 of the modeling compound 800, the second mold component 706 may be moved over and aligned with the first mold component 704, as shown in FIG. 8D. Then, as shown in FIG. 8E, the cap component 708 may be disengaged from the second mold component 706 to expose the plurality of openings 714 of the second mold component 706. Once the plurality of openings 714 are exposed, all of the plurality of openings 714 may be filled with a second quantity of a modeling compound material to form a second layer 812, as shown in FIG. 8F, making an upper surface 814 of the modeling compound material second layer 812 level with the second outer surface 746 of the second mold component 706.

Figure 8G:
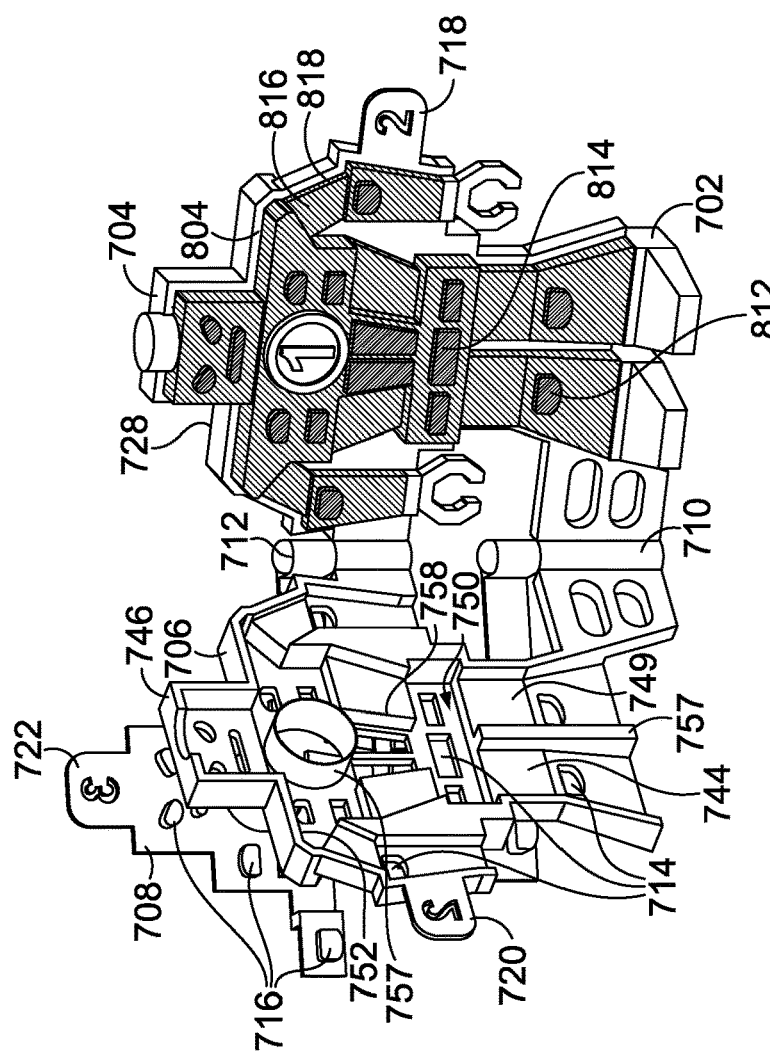

As shown in FIG. 8G, once all of the plurality of openings 714 are filled and the modeling compound material second layer 812 is completed, the second mold component 706 may be opened or separated from the first mold component 704, revealing, for example, a front face 816 and a first half 818 of the 3-D object 820 (shown in FIG. 8H). Finally, as shown in FIG. 8H the, the finalized 3-D object 820 may be removed from the first mold component 704 to reveal the finalized 3-D object 820.

Although the exemplary stencil and/or mold system 700, as shown in FIGS. 8A-8H, is shown as forming a robot figurine, it is contemplated that different objects may be formed such as, for example, superhero figurines, cartoon character figurines, animal figurines, special character figurines, cars, boats, airplanes, and the like that are amenable to being reproduced into a 3-D object having a 3-D body. Further, it is also contemplated that the armature core component may be optional, depending on the type and/or size of the 3-D object being formed.

As described above, the stackable/nesting stencil and/or mold systems, in accordance with aspects herein, allow a user to create bas-relief art or sculptures with detailed "top" deco art features, regardless of the level of artistic ability of the user. Further, the stackable/nesting stencil and/or mold systems allows the user to repeatedly recreate the bas-relief or sculpture time and time again using different types of modeling compound materials if desired.

Since many possible embodiments may be made of the technology described herein without departing from the scope thereof, it is to be understood that all matter herein set forth or shown in the accompanying drawings is to be interpreted as illustrative and not in a limiting sense. Alternatively, the aspects described throughout this specification are intended in all respects to be illustrative rather than restrictive. Upon reading the present disclosure, alternative aspects will become apparent to ordinary skilled artisans that practice in areas relevant to the described aspects without departing from the scope of this disclosure. In addition, aspects of this technology are adapted to achieve certain features and possible advantages set forth throughout this disclosure, together with other advantages which are inherent. It will be understood that certain features and subcombinations are of utility and may be employed without reference to other features and subcombinations. This is contemplated by and is within the scope of the claims.

The invention claimed is:

1. A system for creating a 3-D object from a modeling compound, the system comprising:
   a base plate comprising at least one opening, wherein the at least one opening comprises a raised lip portion having a first height extending along a first perimeter of the at least one opening; and
   one or more nesting stencil plates configured to nest within the base plate, each nesting stencil plate of the one or more nesting stencil plates comprising:

one or more openings aligning with one or more predetermined portions of the at least one opening of the base plate;

a first surface; and a second surface opposite the first surface, wherein the first surface comprises a first flange portion extending therefrom, along a second perimeter of the each nesting stencil plate, wherein the second surface comprises a second flange portion extending therefrom, along a third perimeter of each opening of the one or more openings, and wherein the first flange portion of a nesting stencil plate of the one or more nesting stencil plates is configured to engage and enclose the raised lip portion of the base plate, and wherein the first flange portion comprises a second height that is greater than the first height of the raised lip portion.

2. The system of claim 1, wherein the 3-D object comprises one surface displaying an image or body.

3. The system of claim 1, wherein the 3-D object comprises a 3-D body having two or more surfaces displaying an image.

4. The system of claim 1, wherein the first height of the raised lip portion ranges from 4.7 mm to 6 mm.

5. The system of claim 1, wherein the first surface of a first nesting stencil plate of the one or more nesting stencil plates further comprises one or more protrusions configured to form indentations on the modeling compound filling the at least one opening of the base plate.

6. The system of claim 1, wherein each of the base plate and the one or more nesting stencil plates comprises a sequence indicator.

7. A system for creating a 3-D object from a modeling compound, the system comprising:

a first mold component comprising a first inner surface and a first outer surface, the first inner surface forming a first molding cavity;

a second mold component comprising a second inner surface and a second outer surface, the second inner surface forming a second molding cavity, wherein the second mold component comprises one or more openings; and a cap component comprising a third inner surface and a third outer surface, wherein the third inner surface is configured to be in contact with the second outer surface of the second mold component when engaged with the second mold component, the third inner surface comprising one or more protrusions configured to plug the one or more openings of the second mold component, wherein the first molding cavity of the first mold component and the second molding cavity of the second mold component are complementary to form an enclosed molding cavity, and wherein the system further comprises an armature configured to fit within the enclosed molding cavity.

8. The system of claim 7, wherein the first mold component and the second mold component are moveably connected to each other by an attachment component.

9. The system of claim 8, wherein the attachment component is integral with the first mold component and the second mold component.

10. The system of claim 8, wherein the attachment component comprises a first element and a second element, wherein the first element is integral with the first mold component, and wherein the second element is integral with the second mold component.

11. The system of claim 8, wherein the attachment component is a hinge.

12. The system of claim 11, wherein the hinge is one of a pivot hinge, a coach hinge, a spring hinge, a case hinge, or a barrel hinge.

13. The system of claim 7, wherein the cap component is moveably connected to at least the second mold component by an attachment component.

14. The system of claim 13, wherein the attachment component is integral with the cap component and the second mold component.

15. The system of claim 7, wherein the first mold component, the second mold component, and the cap component are moveably connected to each other by an attachment component, wherein the attachment component comprises a first element, a second element, and a third element, wherein the first element is integral with the first mold component, wherein the second element is integral with the second mold component, and wherein the third element is integral with the cap component.

16. A kit for creating a plurality of 3-D objects from a modeling compound, the kit comprising a plurality of systems for creating a plurality of 3-D objects, wherein each system in the plurality of systems comprises:

a base plate comprising at least one opening, wherein the at least one opening comprises a raised lip portion having a first height, the lip portion extending along an entire first perimeter of the at least one opening; and one or more nesting stencil plates configured to nest within the base plate, each nesting stencil plate of the one or more nesting stencil plates comprising:

one or more openings aligning with one or more predetermined portions of the at least one opening of the base plate;

a first surface; and a second surface opposite the first surface, wherein the first surface comprises a border portion extending therefrom, along a perimeter of each nesting stencil plate, wherein the second surface comprises a flange portion extending therefrom, along an entire shaped opening perimeter of each of the one or more shaped openings, and wherein the flange portion of a nesting stencil plate of the one or more nesting stencil plates is configured to engage and enclose the raised lip portion of the base plate, and wherein the flange portion comprises a second height that is greater than the first height of the raised lip portion.

17. The kit of claim 16, wherein the one or more nesting stencil plates of a first system in the plurality of systems are interchangeable with the one or more nesting stencil plates of a second system in the plurality of systems.

* * * * *